(12) United States Patent
Hwang et al.

(10) Patent No.: US 11,778,640 B2
(45) Date of Patent: Oct. 3, 2023

(54) METHOD AND DEVICE FOR PERFORMING SL COMMUNICATION ON BASIS OF ASSISTANCE INFORMATION IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/084,161

(22) Filed: Dec. 19, 2022

(65) Prior Publication Data

US 2023/0123147 A1    Apr. 20, 2023

Related U.S. Application Data

(63) Continuation of application No. PCT/KR2021/008739, filed on Jul. 8, 2021.

(30) Foreign Application Priority Data

Jul. 22, 2020 (KR) .................. 10-2020-0090768
Aug. 6, 2020 (KR) .................. 10-2020-0098724
Aug. 31, 2020 (KR) .................. 10-2020-0110316

(51) Int. Cl.
*H04W 72/40* (2023.01)
*H04W 72/25* (2023.01)
*H04W 72/1263* (2023.01)

(52) U.S. Cl.
CPC ........... *H04W 72/40* (2023.01); *H04W 72/25* (2023.01); *H04W 72/1263* (2013.01)

(58) Field of Classification Search
CPC .............................. H04W 72/25; H04W 72/40
See application file for complete search history.

(56) References Cited

U.S. PATENT DOCUMENTS 11,178,578 B2 * 11/2021 Huang .................. H04W 28/26
2021/0227604 A1 * 7/2021 Huang .................. H04W 72/02
(Continued)

FOREIGN PATENT DOCUMENTS

WO    WO2020017939    1/2020
WO    WO2020033704    2/2020

OTHER PUBLICATIONS

Apple, "On NR V2X Physical Layer Structure," R1-1912810, Presented at 3GPP TSG RAN WG1 #99, Reno, USA, Nov. 18-22, 2019, 15 pages.

(Continued)

*Primary Examiner* — Raj Jain
(74) *Attorney, Agent, or Firm* — Fish & Richardson P.C

(57) ABSTRACT

A method by which a first device performs wireless communication, and a device for supporting same. The method includes receiving, from a second device, first sidelink control information (SCI) including scheduling information about a physical sidelink shared channel (PSSCH) through a physical sidelink control channel (PSCCH), the first SCI including information related to priority, information related to frequency resource allocation, information related to time resource allocation, information related to a demodulation reference signal (DMRS) pattern, and information related to a modulation and coding scheme (MCS); receiving, from the second device, assistance information including information related to first resources and information related to a service type through the PSSCH; generating a medium access control protocol data unit (MAC PDU); selecting a sidelink (SL) resource from among the first resources based on the MAC PDU being related to the service type; and transmitting the MAC PDU based on the SL resource.

20 Claims, 20 Drawing Sheets

(56) References Cited

U.S. PATENT DOCUMENTS

2022/0104197 A1* 3/2022 Li .................. H04L 5/0098
2022/0337348 A1* 10/2022 Hahn .............. H04L 1/1896
2023/0123147 A1* 4/2023 Hwang ............ H04W 72/02
370/329

OTHER PUBLICATIONS

LG Electronics, "Discussion on resource allocation for Mode 2," R1-1912588, Presented at 3GPP TSG RAN WG1 #99, Reno, USA, Nov. 18-22, 2019, 16 pages.
Office Action in Korean Appln. No. 10-2022-7042704 dated Jan. 20, 2023, 5 pages.
LG Electronics, "Discussion on resource allocation for Mode 2," R1-2003563, Presented at 3GPP TSG RAN WG1 Meeting #101, e-Meeting, May 25-Jun. 5, 2020, 7 pages.
LG Electronics, "Feature lead summary#2 for AI 7.2.4.5 Physical layer procedures for sidelink," R1-2004930, Presented at 3GPP TSG RAN WG1 #101, e-Meeting, May 25-Jun. 5, 2020, 39 pages.
Vivo, "Remaining issues on mode 2 resource allocation mechanism," R1-2003379, Presented at 3GPP TSG-RAN WG1 Meeting #101, e-Meeting, May 25-Jun. 5, 2020, 7 pages.

* cited by examiner

METHOD AND DEVICE FOR PERFORMING SL COMMUNICATION ON BASIS OF ASSISTANCE INFORMATION IN NR V2X

CROSS-REFERENCE TO RELATED APPLICATIONS

Pursuant to 35 U.S.C. § 119(e), this application is a continuation of International Application PCT/KR2021/008739, with an international filing date of Jul. 8, 2021, which claims the benefit Korean Patent Application No. 10-2020-0090768, filed on Jul. 22, 2020, Korean Patent Application No. 10-2020-0098724, filed on Aug. 6, 2020, and Korean Patent Application No. 10-2020-0110316, filed on Aug. 31, 2020, the contents of which are hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, a first device may transmit assistance information to a second device, and the second device may select SL resource(s) based on the assistance information. In this case, the form of the assistance information, conditions for using the assistance information, etc. need to be specifically defined.

In one embodiment, provided is a method for performing wireless communication by a first device. The method may comprise: receiving, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); receiving, from the second device through the PSSCH, assistance information including information related to at least one first resource and information related to a service type; generating a medium access control (MAC) protocol data unit (PDU); selecting a sidelink (SL) resource from among the at least one first resource, based on that the MAC PDU is related to the service type; and transmitting the MAC PDU based on the SL resource.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: receive, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); receive, from the second device through the PSSCH, assistance information including information related to at least one first resource and information related to a service type; generate a medium access control (MAC) protocol data unit (PDU); select a sidelink (SL) resource from among the at least one first resource, based on that the MAC PDU is related to the service type; and transmit the MAC PDU based on the SL resource.

The user equipment (UE) can efficiently perform SL communication.

DETAILED DESCRIPTION

Figure 1:
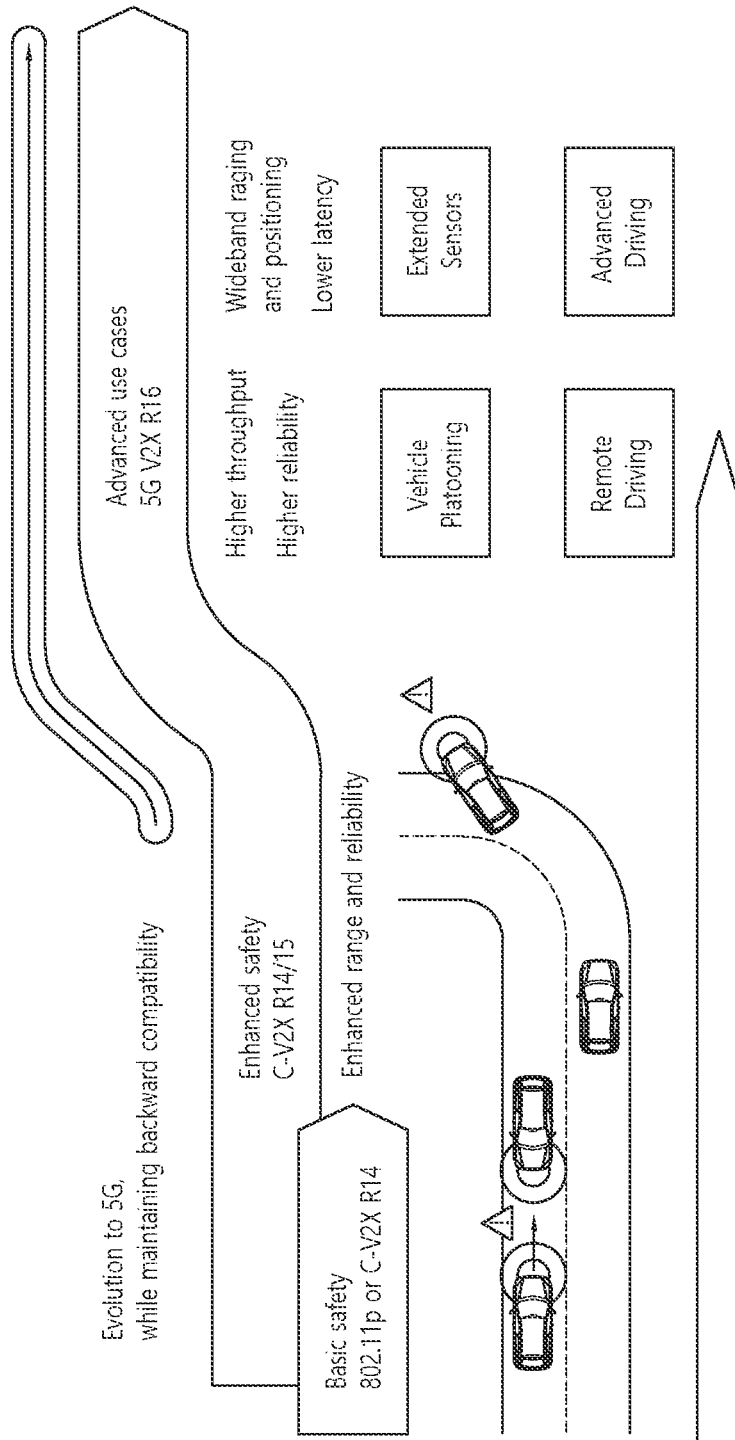
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
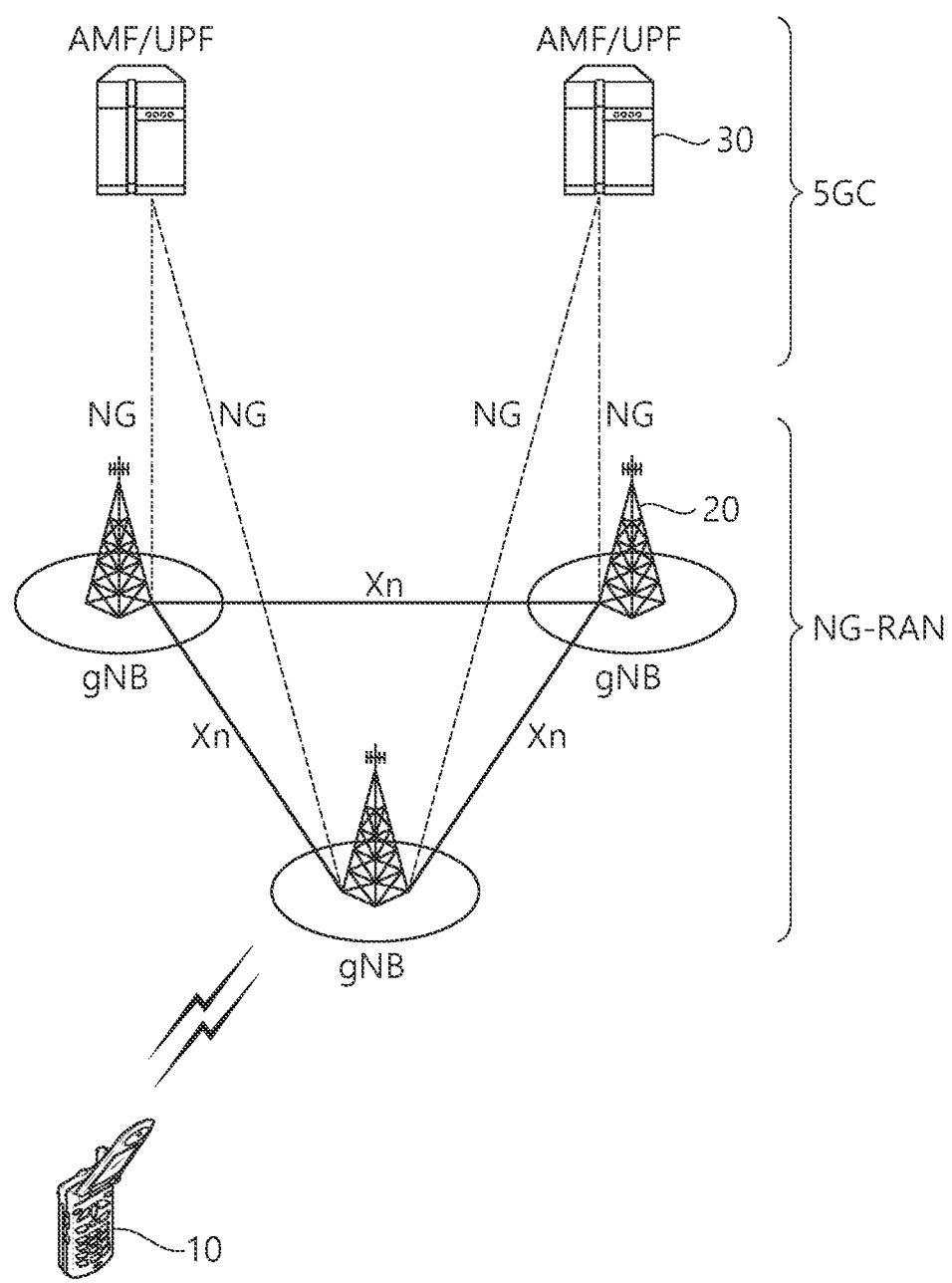
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
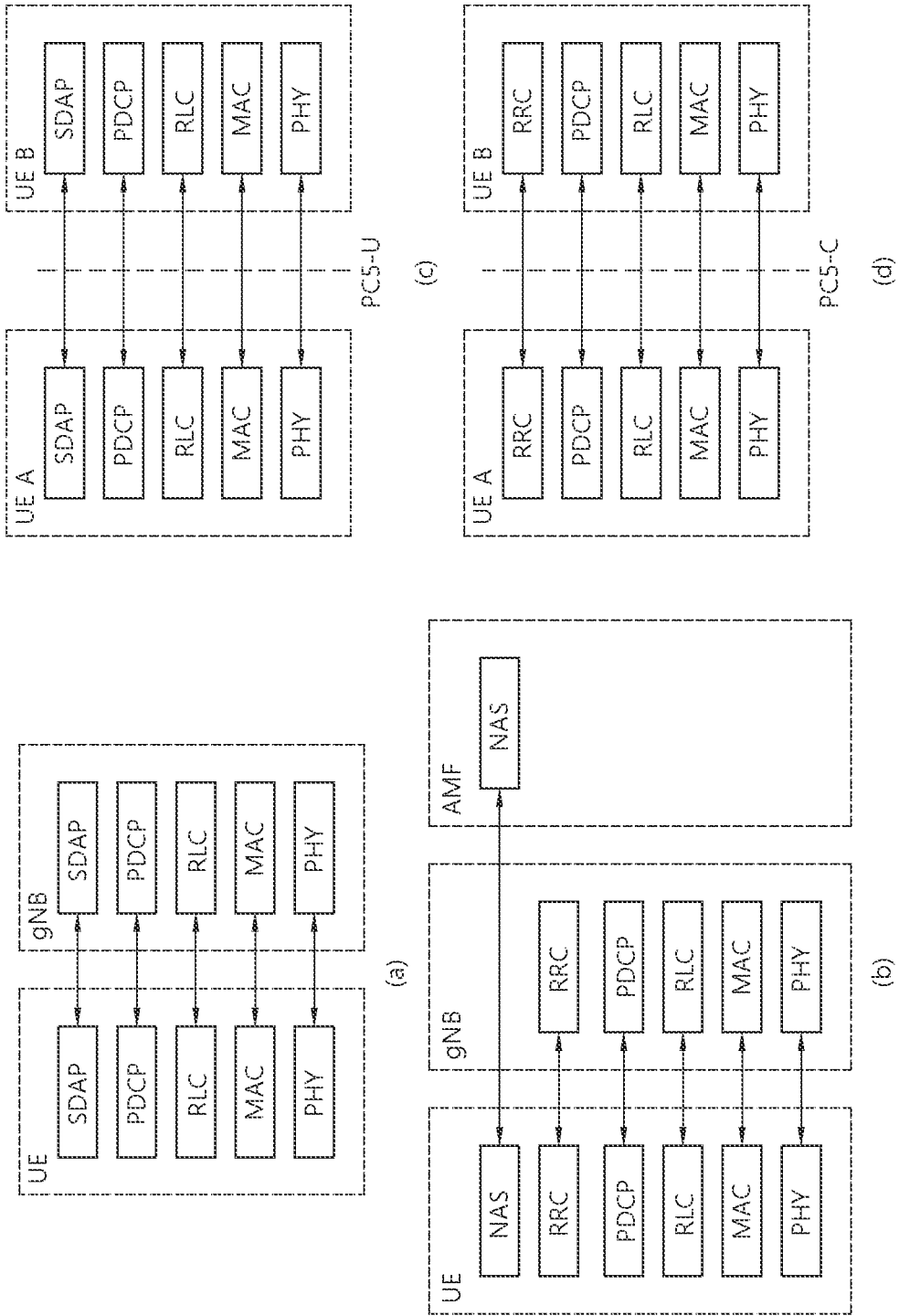
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
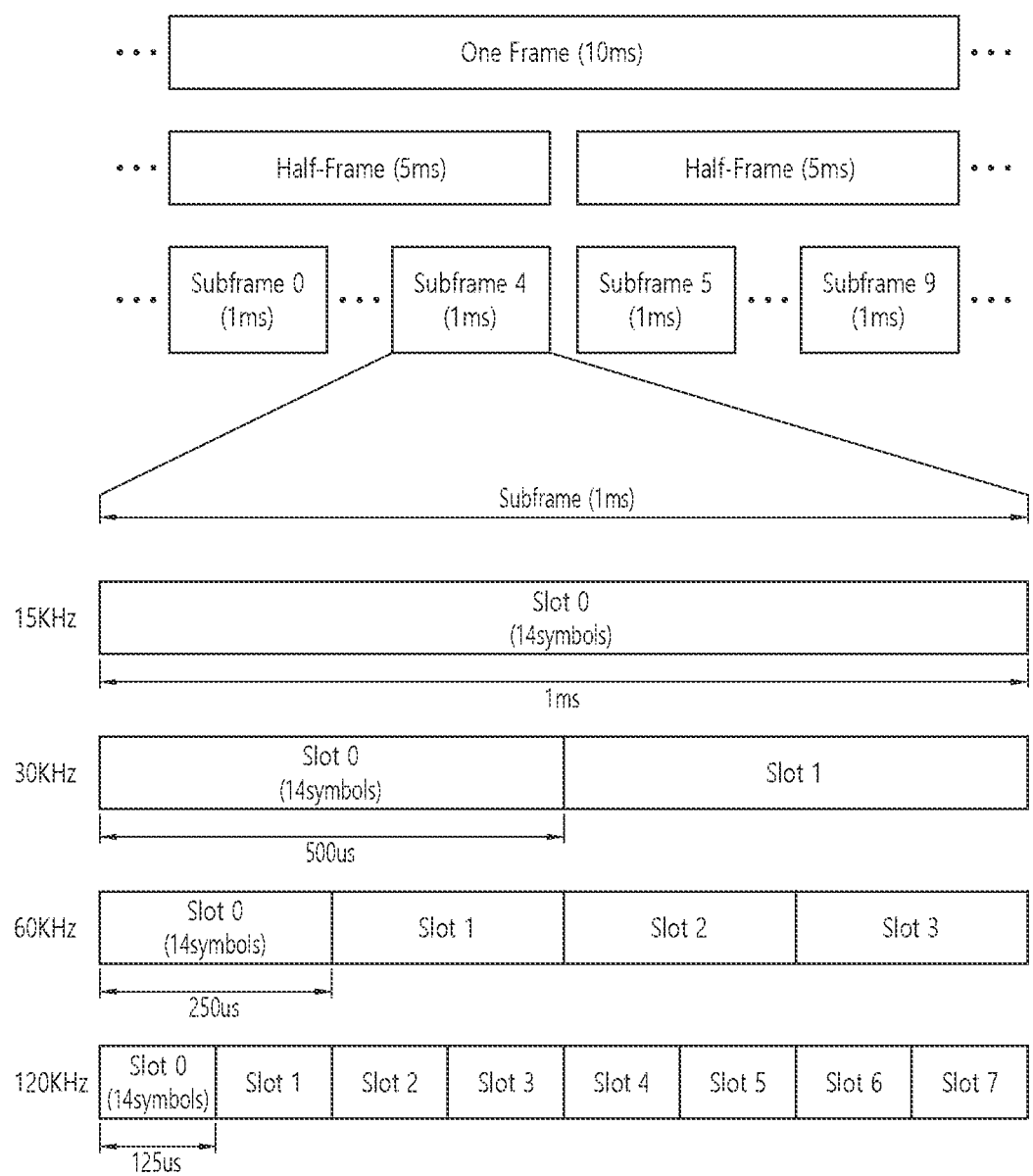
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
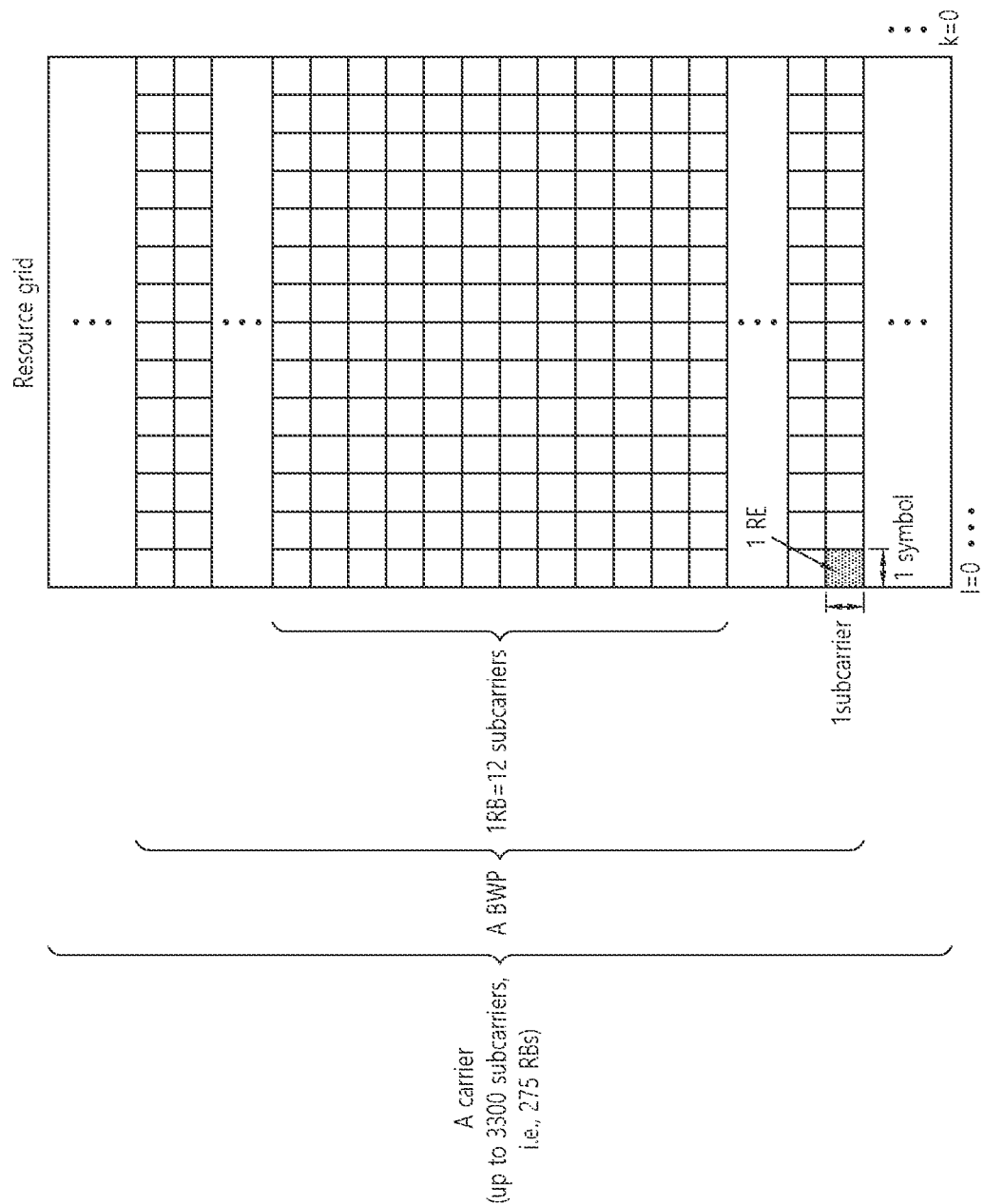
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
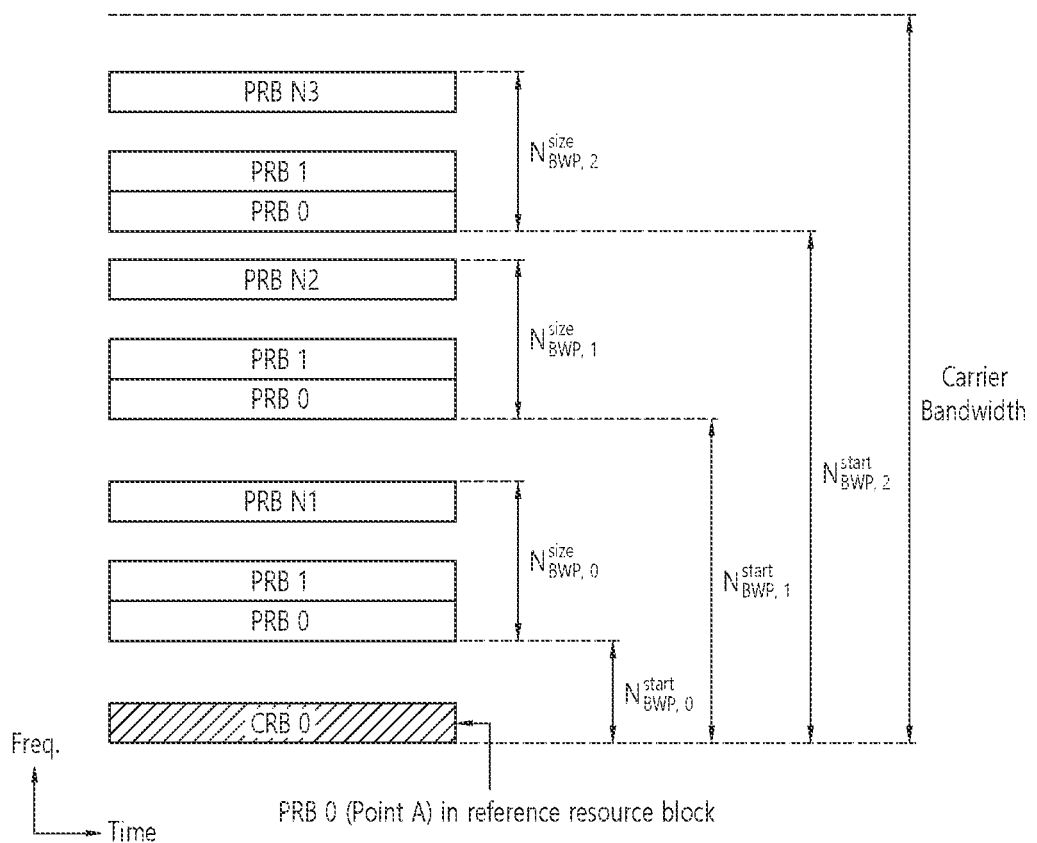
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
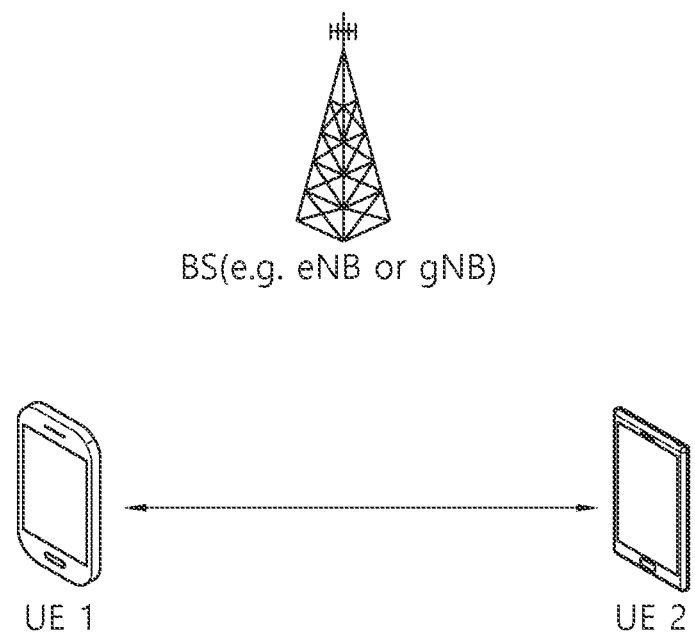
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
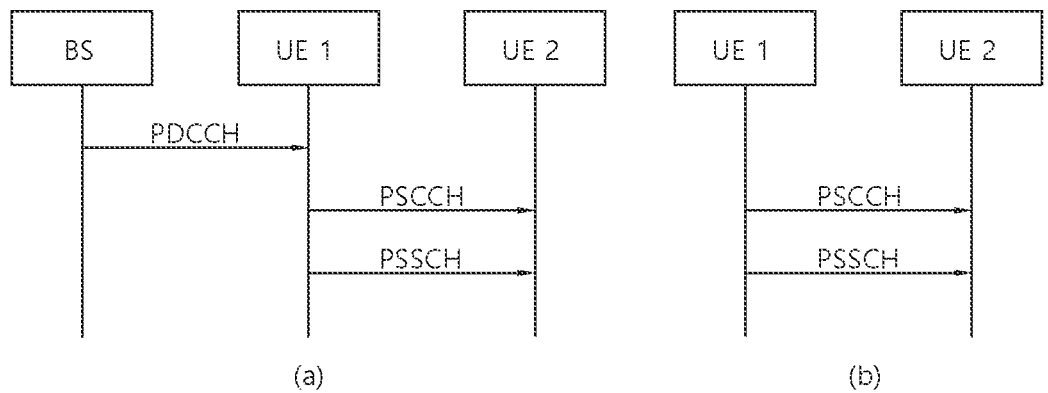
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
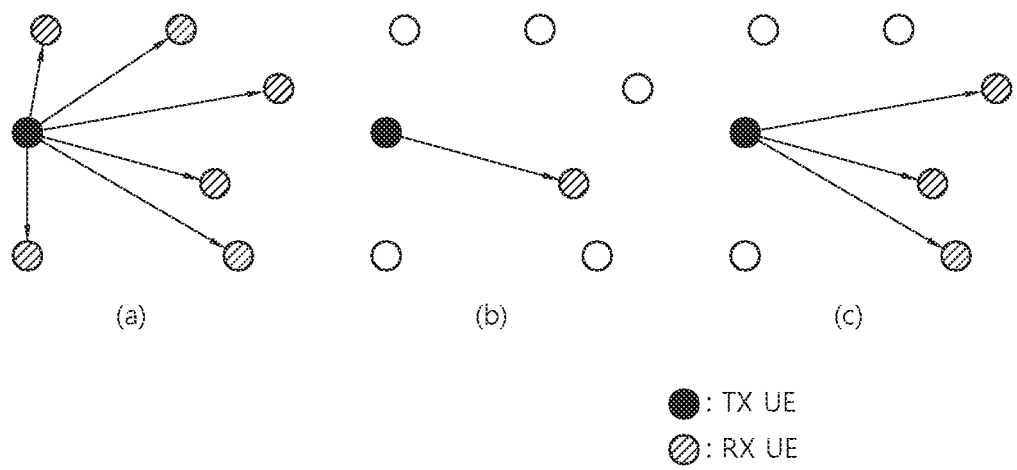
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
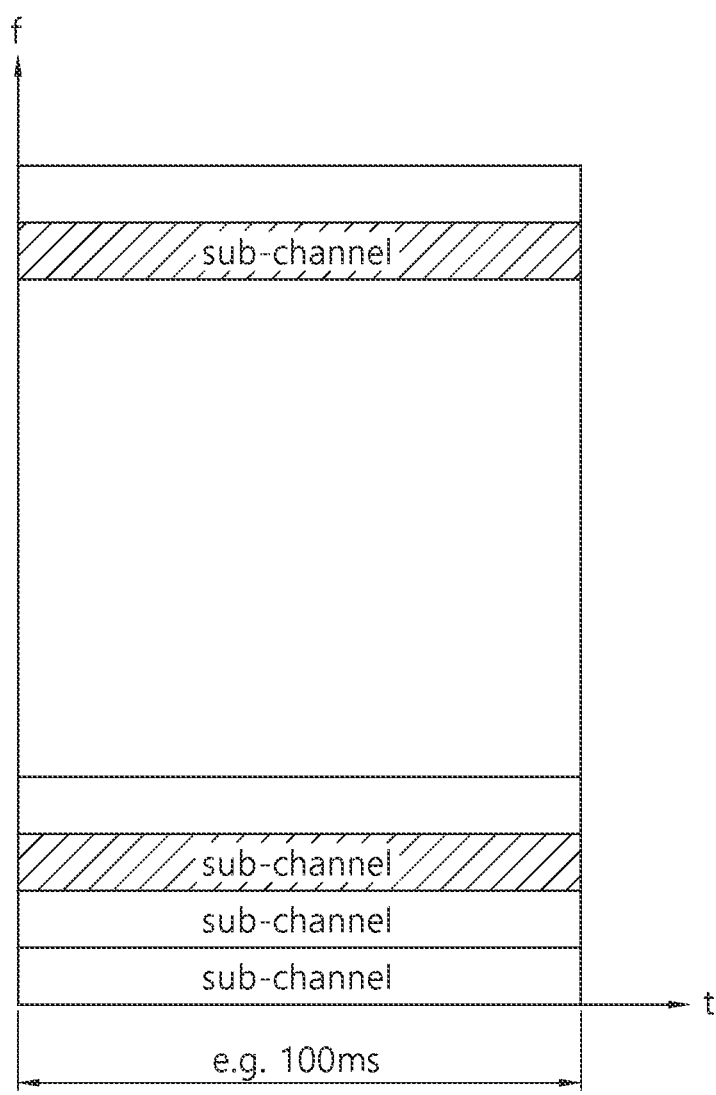
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SC may include information related to channel sensing. For example, the receiving UE may decode the second SCI by using a PSSCH DMRS. A polar code used in a PDCCH may be applied to the second SCI.

For example, in a resource pool, a payload size of the first SCI may be identical for unicast, groupcast, and broadcast. After decoding the first SCI, the receiving UE does not have to perform blind decoding of the second SCI. For example, the first SC may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

In the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

In the present disclosure, for example, a resource block (RB) may be replaced/substituted with a subcarrier. Also, for example, in the present disclosure, a packet or traffic may be replaced/substituted with a transport block (TB) or a medium access control protocol data unit (PDU) according to a transmitted layer.

In the present disclosure, for example, a source ID may be replaced/substituted with a destination ID.

In the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, the base station may allocate resource(s) used for transmission and reception of SL channel(s)/signal(s) (hereinafter, SL resource(s)) to the UE. For example, the base station may transmit information related to the resource(s) to the UE. In the present disclosure, a method in which the base station allocates SL resource(s) to the UE may be referred to as mode 1 method, mode 1 operation, or resource allocation mode 1.

On the other hand, the UE may select SL resource(s) within a resource pool based on sensing. In the present disclosure, a method for selecting SL resource(s) by the UE may be referred to as a mode 2 method, a mode 2 operation, or a resource allocation mode 2. For example, in the resource allocation mode 2, the UE may detect a SCI transmitted by other UE(s), and the UE may identify resource(s) reserved by the other UE(s) based on the SCI, and the UE may obtain an RSRP measurement value. In addition, based on the above-described sensing result, the UE may select resource(s) to be used for SL transmission excluding specific resource(s) within a resource selection window. In the case of the sensing operation, the UE may refer to resource allocation information received through a first SCI. However, due to an overhead of the first SCI, the amount of information that can be obtained by the UE in the first SCI may be limited.

Based on various embodiments of the present disclosure, in order to assist a sensing operation and/or a resource selection operation of a first UE, a second UE may transmit additional assistance information. The first UE may use assistance information received from the second UE in order to improve PSSCH detection performance and/or reduce half-duplex limitation and/or select spare resource(s) for transmission and reception of specific signal(s). In an embodiment of the present disclosure, for convenience of description, it is assumed that a UE-A transmits assistance information to a UE-B. It is assumed that the UE-B selects resource(s) for PSCCH/PSSCH to be transmitted to the UE-A and/or resource(s) for PSCCH/PSSCH to be transmitted to a UE-C (i.e., a third UE) based on the assistance information received from the UE-A.

Figure 11:
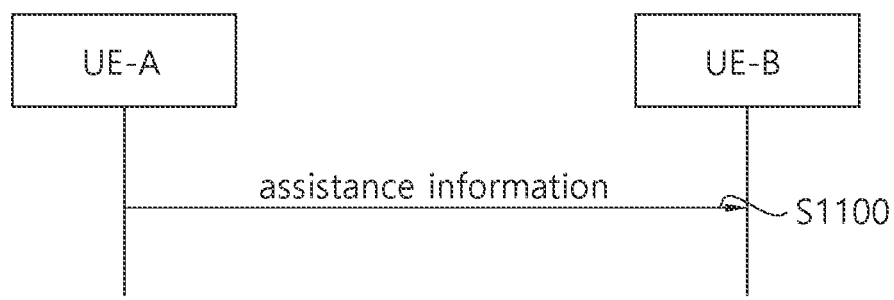
FIG. 11 shows a procedure for a UE-A to transmit assistance information to a UE-B, based on an embodiment of the present disclosure.

FIG. 11 shows a procedure for a UE-A to transmit assistance information to a UE-B, based on an embodiment of the present disclosure. The embodiment of FIG. 11 may be combined with various embodiments of the present disclosure.

Referring to FIG. 11, in step S1100, the UE-A may transmit assistance information to the UE-B. For example, the UE-B may select resource(s) for PSCCH/PSSCH to be transmitted to the UE-A, based on assistance information received from the UE-A, and the UE-B may perform SL transmission by using the resource(s). For example, the UE-B may select resource(s) for PSCCH/PSSCH to be transmitted to the UE-C based on assistance information received from the UE-A, and the UE-B may perform SL transmission by using the resource(s).

Based on an embodiment of the present disclosure, information related to reserved resource(s) to be notified by the UE-A to the UE-B may be extended. For example, the assistance information may include information related to additional resource(s) in addition to information related to resource(s) included in a SCI. For example, information related to resource(s) included in the assistance information may be information related to extended reserved resource(s). Specifically, for example, the UE-A may transmit information related to other reserved resource(s) (e.g., information related to frequency domain resource(s) and/or information related to time domain resource(s)) to the UE-B through assistance information, in addition to information related to reserved resource(s) (e.g., up to three resources) transmitted through the SCI. In this case, for the additionally indicated reserved resource(s), the UE-B may determine whether to exclude resource(s) corresponding to the reserved resource(s) within a resource selection window. For example, the reserved resource(s) may be indicated in the form of a plurality of groups. For example, each of the plurality of reserved resource groups may be indicated by a first SCI and/or indicated by a second SCI and/or indicated by a (data within) PSSCH. For example, a priority value may be additionally configured/indicated for each reserved resource group. For example, an RSRP measurement value may be additionally configured/indicated for each reserved resource group. For example, an RSRP threshold (for a combination of priorities) may be additionally configured/indicated for each reserved resource group. For example, a specific level value may be additionally configured/indicated for each reserved resource group. For example, when (re)selecting a resource, the UE-B may differently process the indicated reserved resource for each specific level value. For example, for a reserved resource group with a specific level, even if an RSRP measurement value is greater than (equal to or greater than) an RSRP threshold, the UE-B may not (probably) exclude the reserved resource group with the specific level from a resource set selectable for transmission. For example, the extended reserved resource(s) may be for the same TB. For example, the extended reserved resource(s) may be for multiple TBs. For example, if the extended reserved resource(s) is for multiple TBs, an indication unit of the extended reserved resource(s) may be each TB unit. For example, the UE-A may select the extended reserved resource(s), through a resource (re)selection procedure, based on at least one of the number of retransmissions, whether or not it is retransmission, the size of a packet, priority information, and/or information related to a TB from a higher layer (e.g., MAC layer). Herein, the UE-A may perform a sensing operation, and when the UE-A performs a resource (re)selection procedure for each resource group or (re)selects resource(s), the size of the corresponding window and/or the number of resources may be extended. For example, the size of the window may be configured or pre-configured for the UE. For example, whether or not the size of the window is extended may be configured or pre-configured for the UE. For example, the (maximum) number of resources may be configured or pre-configured for the UE. For example, whether or not the (maximum) number of resources is extended may be configured or pre-configured for the UE.

Based on an embodiment of the present disclosure, the UE-A may transmit, to the UE-B, information related to time domain resource(s) through which the UE-A cannot perform SL reception and/or information related to time domain resource(s) through which the UE-A can perform SL reception. For example, the UE-A may transmit, to the UE-B, information related to frequency domain resource(s) through which the UE-A cannot perform SL reception and/or information related to frequency domain resource(s) through which the UE-A can perform SL reception. For example, the assistance information may include information related to time domain resource(s) through which the UE-A cannot perform SL reception and/or information related to time domain resource(s) through which the UE-A can perform SL reception. For example, the assistance information may include information related to frequency domain resource(s) through which the UE-A cannot perform SL reception and/or information related to frequency domain resource(s) through which the UE-A can perform SL reception. For example, the UE-A may transmit, to the UE-B, information related to time domain resource(s) and/or information related to frequency domain resource(s) in which the UE-A may have low reception performance. For example, the UE-A may transmit, to the UE-B, information related to time domain resource(s) and/or information related to frequency domain resource(s) in which the UE-A may have high reception performance. For example, the low reception performance may refer to that a target error probability is greater than or equal to a specific threshold. For example, the high reception performance may refer to that a target error probability is less than or equal to a specific threshold. For example, the low reception performance may refer to that a target SINR and/or a target SNR is less than or equal to a specific threshold. For example, the high reception performance may refer to that a target SINR and/or a target SNR is greater than or equal to a specific threshold. For example, the low reception performance may refer to that a target interference level is greater than or equal to a specific threshold. For example, the high reception performance may refer to that a target interference level is less than or equal to a specific threshold. That is, if the UE-A intends to receive PSCCH/PSSCH from the UE-B, the UE-A may transmit information related to preferred resource(s) and/or information related to non-preferred resource(s) to the UE-B. In this case, the UE-B may transmit PSCCH/PSSCH to a UE group including at least UE-A by using resource(s) other than the non-preferred resource(s). For example, the UE-B may transmit PSCCH/PSSCH to a UE group including at least UE-A by preferentially using the preferred resource(s). For example, the UE-A may determine/configure a domain in which reception is not possible and/or a domain in which reception is possible, based on time when SL transmission is scheduled and/or time when UL transmission is scheduled and/or time when DL reception is scheduled. For example, the UL transmission and/or the DL reception may be limited to transmission/reception satisfying a specific condition (e.g., URLLC (e.g., corresponding to priority index 1)). For example, the UL transmission and/or the DL reception may be limited to transmission/reception corresponding to system information and/or paging and/or random access (e.g., PRACH and/or MsgA and/or Msg3 and/or random access response and/or MsgB). For example, UE-A may determine/configure the corresponding resource(s) according to whether or not an RSRP measurement value for each resource (e.g., slot, subchannel, group of slots and/or group of subchannels) is higher than a specific threshold through a sensing operation. For example, the specific threshold may be (pre-)configured, pre-defined, or selected by the UE implementation. For example, the UE-A may determine/configure the corresponding resource(s) based on an SINR estimation value and/or an RSSI measurement value for each resource (e.g., slot, subchannel, group of slots and/or group of subchannels).

Based on an embodiment of the present disclosure, the UE-A may transmit all or part of information regarding a sensing operation performed by the UE-A to the UE-B. For example, the assistance information may include information obtained by the UE-A based on the sensing operation. For example, the information regarding the sensing operation may include at least one of information related to RSRP measurement value(s), priority information, and/or information related to reserved resource(s) indicated by a first SCI and/or a second SCI and/or a PSSCH detected by the UE-A. For example, the information regarding the sensing operation may include information regarding a resource selection window of the UE-A and/or information on (all or part of) resources excluded from a resource selection target based on sensing within the resource selection window. Herein, in resource selection, the UE-B may consider resource(s) indicated through a SCI detected by the UE-A but not detected by the UE-B. For example, when the UE-B performs resource (re)selection, the UE-B may not (re)select a resource indicated through a SCI detected by the UE-A but not detected by the UE-B based on the above information. That is, according to the above method, interference from a UE that the UE-B is not aware of due to a hidden-node problem can be minimized.

Based on an embodiment of the present disclosure, the UE-A may configure or propose, to the UE-B, a condition in which all or part of resources can be used. For example, the UE-A may configure or propose, to the UE-B, a condition in which all or part of resources cannot be used. For example, the assistance information may include a condition in which the UE-B can use all or part of resources and/or a condition in which the UE-B cannot use all or part of resources. For example, the condition may include a specific priority. For example, the condition may include a type of a service. For example, the condition may include a QoS parameter. For example, the condition may include a cast type. For example, the condition may include whether SL HARQ feedback is enabled. For example, the condition may include a SL HARQ feedback option. For example, the condition may include a range of an RSRP measurement value.

For example, the UE-A may transmit, to the UE-B, information related to a specific time interval and/or information related to time-frequency resource(s). Additionally, for example, the UE-A may transmit, to the UE-B, a condition in which the resource(s) can be used.

For example, if a priority value is less than or equal to (less than) a specific threshold ((pre-)configured and/or configured through PC5-RRC), the UE-B may use the resource(s). For example, otherwise, the UE-B may suspend use of the resource(s) or cancel already allocated transmission.

For example, if a priority value is greater than or equal to (greater than) a specific threshold ((pre-)configured and/or configured through PC5-RRC), the UE-B may use the resource(s). For example, otherwise, the UE-B may suspend use of the resource(s) or cancel already allocated transmission.

For example, if a total or remaining packet delay budget (PDB) value is less than or equal to (less than) a specific threshold ((pre-)configured and/or configured through PC5-RRC), the UE-B may use the resource(s). For example, otherwise, the UE-B may suspend use of the resource(s) or cancel already allocated transmission.

For example, if a total or remaining packet delay budget (PDB) value is greater than or equal to (greater than) a specific threshold ((pre-)configured and/or configured through PC5-RRC), the UE-B may use the resource(s). For example, otherwise, the UE-B may suspend use of the resource(s) or cancel already allocated transmission.

For example, if RSRP measurement value(s) corresponding to the resource(s) (e.g., value(s) measured based on DMRS and/or CSI-RS on PSCCH and/or PSSCH used to indicate the resource(s)) is less than or equal to (less than) a third threshold, the UE-B may suspend the use of the resource(s) or cancel the already allocated transmission. For example, otherwise, the UE-B may use the resource(s). For example, the third threshold may be configured or pre-configured for the UE for each resource pool. For example, the third threshold may be configured or pre-configured for the UE for each priority. For example, the third threshold may be configured or pre-configured for the UE for each QoS parameter. For example, the third threshold may be configured or pre-configured for the UE for each congestion control level. For example, the third threshold may be configured or pre-configured for the UE for each resource pool. Through the above method, for example, resource(s) determined to have a good channel environment may be reserved for emergency communication.

For example, a unit in which the resource(s) is configured may be a single subchannel. For example, a unit in which the resource(s) is configured may be a plurality of subchannels. For example, a unit for configuring/indicating a resource corresponding to a transmission deferral target or a transmission prioritization target may be configured or pre-configured for the UE for each resource pool. For example, a unit for configuring/indicating a resource corresponding to a transmission deferral target or a transmission prioritization target may be configured or pre-configured for the UE for each priority. For example, a unit for configuring/indicating a resource corresponding to a transmission deferral target or a transmission prioritization target may be configured or pre-configured for the UE for each QoS parameter. For example, a unit for configuring/indicating a resource corresponding to a transmission deferral target or a transmission prioritization target may be configured or pre-configured for the UE for each congestion level. Through the above-described method, it is possible to adjust the amount of contiguous resources on a frequency domain according to the size of an emergency message. For example, the large number of subchannels may be allocated to an emergency message having a large size. For example, the UE-A may receive an emergency message or an emergency situation and/or related information (e.g., size, traffic characteristics, duration, QoS parameters, and/or priority of the emergency message, etc.) from a higher layer (e.g., application layer and/or V2X layer and/or AS layer), and the UE-A may determine/configure usable conditions and/or unavailable conditions for a specific resource based on the information.

Based on an embodiment of the present disclosure, the UE-A may transmit information related to cancellation of all or part of resources previously reserved by the UE-A to the UE-B. For example, the assistance information may include information related to cancellation of resource(s) previously reserved by the UE-A. For example, the UE-A may instruct the UE-B again the resource(s) corresponding to the reservation cancellation, through a first SCI and/or a second SCI and/or a PSSCH, by using the form of Time Resource Indicator Value (TRIV) and/or Frequency Resource Indicator Value (FRIV)(resource allocation method). For example, the UE-A may transmit a reservation cancellation indication value to the UE-B through the first SCI and/or the second SCI and/or the PSSCH. In this case, for resource reservation information received through the PSCCH and/or the PSSCH previously transmitted by the UE-A, the UE-B may cancel reserved resource(s) at time of receiving the reservation cancellation information or after specific time (predefined or (pre-)configured value) from the corresponding time. Upon reservation cancellation, the UE-B may trigger resource reselection. For example, the UE-A may transmit/report information representing release of all or part of resources allocated by the base station to the base station. For example, the UE-A may transmit/report, to the base station, information representing that all or part of resources allocated by the base station is not used. For example, the report may be transmitted through a PUCCH and/or a PUSCH. For example, the UE-C (i.e., a third UE) may transmit information representing that the UE-A releases all or part of reserved resources to the UE-B. For example, if the UE-A transmits a first TB on all or part of reserved resources and the UE-A determines that the target UE successfully received the first TB (i.e., ACK), the UE-A may determine/configure to release later reserved resource(s) for the first TB. For example, if the UE-A receives ACK in unicast or groupcast HARQ feedback option 2, or if the UE-A does not receive a PSFCH indicating NACK in groupcast HARQ feedback option 1, the UE-A may determine/configure to release later reserved resource(s) for the same TB. For example, if the UE-A performs (re)transmission for the same TB by exceeding the number of (re)transmissions on all or part of reserved resources, the UE-A may determine/configure to release later reserved resource(s) for the same TB. For example, if there is no remaining packet delay budget (PDB) for the same TB for all or part of reserved resources, the UE-A may determine/configure to release later reserved resource(s) for the same TB. For example, if the remaining PDB for the same TB for all or part of reserved resources is below (e.g., less than or equal to) a specific threshold ((pre-)configured or predefined or configured through PC5-RRC), the UE-A may determine/configure to release later reserved resource(s) for the same TB.

Additional resource information described in various embodiments of the present disclosure may be in the form of indicating/representing frequency domain resource(s) and/or time domain resource(s). For example, the resource information may be in the form of one combination or multiple combinations of TRIV and/or FRIV and/or a resource reservation period and/or a priority and/or a use level. Each combination may be transmitted through a first SCI and/or a second SCI and/or a PSSCH. For example, each resource group indicator combination may be included in different channels and/or signals and/or information. For example, the number of resource group indicator combinations may be configured or pre-configured for the UE for each resource pool. For example, the number of resource group indicator combinations may be configured or pre-configured for the UE for each first SCI indication value. For example, the number of resource group indicator combinations may be configured or pre-configured for the UE for each second SCI format. For example, whether or not the next resource group indicator combination exists may be indicated by the previous resource group indicator combination.

For example, TRIV may indicate/represent i) time when the UE-B receives a SCI and/or ii) one or two slot offset values from the time. Herein, TRIV may indicate/represent up to three time domain resources. For example, TRIV may indicate/represent i) time of a resource that is latest in time among time domain resources derived from TRIV indicated by a first SCI and/or ii) one or two slot offset values from the time. For example, TRIV may indicate/represent i) time of a resource that is latest in time among time domain resources indicated by a previous resource group indicator and/or ii) one or two slot offset values from the time. For example, a plurality of forms of TRIV and the reference point may be used in combination. For example, a case in which the SCI reception time is a reference point may be a case in which TRIV is transmitted through a first SCI and/or a case in which TRIV is transmitted through a second SCI. For example, a case in which the last PSSCH resource time indicated by the first SCI or the last PSSCH resource time indicated by the previous group indicator is a reference point may be a case in which TRIV is transmitted through a second SCI and/or a case in which TRIV is transmitted through a PSSCH. For example, the maximum number of slot offsets (e.g., 1 or 2) that can be indicated/represented by TRIV for each resource group indicator may be the same as a TRIV configuration of the first SCI. For example, the maximum number of slot offsets that can be indicated/represented by TRIV for each resource group indicator may be configured or pre-configured for the UE for each resource group indicator For example, the maximum number of slot offsets that can be indicated/represented by TRIV for each resource group indicator may be configured or pre-configured for the UE for each second SCI format. For example, the maximum number of slot offsets that can be indicated/represented by TRIV for each resource group indicator may be configured or pre-configured for the UE for each resource pool. For example, information related to the maximum number of slot offsets that can be indicated/represented by TRIV for each resource group indicator may be transmitted through the first SCI. For example, information related to the maximum number of slot offsets that can be indicated/represented by TRIV for each resource group indicator may be transmitted through the second SCI. For example, information related to the maximum number of slot offsets that can be indicated/represented by TRIV for each resource group indicator may be transmitted through the PSSCH. For example, the maximum number of slot offsets may be 1 or 2. For example, the length of a time interval or the number of slots that can be indicated/represented by TRIV for each resource group indicator may be configured or pre-configured for the UE for each resource group indicator. For example, the length of a time interval or the number of slots that can be indicated/represented by TRIV for each resource group indicator may be configured or pre-configured for the UE for each second SCI format. For example, the length of a time interval or the number of slots that can be indicated/ represented by TRIV for each resource group indicator may be configured or pre-configured for the UE for each resource pool.

For example, FRIV may indicate/represent the number of subchannels allocated for single PSSCH resource or multiple PSSCH resources, and/or starting subchannel index(es) for time of PSSCH resource(s) indicated/represented by TRIV other than time when UE-B receives a SCI. For example, FRIV may indicate/represent the number of subchannels allocated for single PSSCH resource or multiple PSSCH resources, and/or starting subchannel index(es) for one PSSCH resource or two PSSCH resources indicated/ represented by TRIV. For example, the one or two PSSCH resources may be resource(s) located after the last PSSCH resource indicated/represented by a first SCI. For example, the one or two PSSCH resources may be resource(s) located after the last PSSCH resource indicated/represented by a previous resource group indicator. For example, a plurality of forms of FRIV and the reference point may be used in combination.

For example, the number of allocated subchannels that can be indicated/represented by FRIV for each resource group indicator may be the same. In this case, FRIV of a resource group indicator transmitted in other than a first SCI may not include information related to the number of allocated subchannels. That is, information related to the number of allocated subchannels may be excluded/omitted from FRIV of the resource group indicator transmitted in other than the first SCI.

For example, the number of allocated subchannels that can be indicated/represented by FRIV for each resource group indicator may be different. The above method may be particularly useful when the corresponding TBs are different for each resource group. For example, the maximum number of PSSCH resources that can be indicated/represented by FRIV for each resource group indicator may be the same as a FRIV configuration of a first SCI. For example, the maximum number of PSSCH resources that can be indicated/represented by FRIV for each resource group indicator may be configured or pre-configured for the UE for each resource group indicator. For example, the maximum number of PSSCH resources that can be indicated/represented by FRIV for each resource group indicator may be configured or pre-configured for the UE for each second SCI format. For example, the maximum number of PSSCH resources that can be indicated/represented by FRIV for each resource group indicator may be configured or pre-configured for the UE for each resource pool. For example, information related to the maximum number of PSSCH resources that can be indicated/represented by FRIV for each resource group indicator may be transmitted through a first SCI. For example, information related to the maximum number of PSSCH resources that can be indicated/represented by FRIV for each resource group indicator may be transmitted through a second SCI. For example, information related to the maximum number of PSSCH resources that can be indicated/represented by FRIV for each resource group indicator may be transmitted through a PSSCH.

For example, a priority value may be the same for each resource group indicator. In this case, a combination of resource group indicators transmitted in other than a first SCI may not include priority information. That is, priority information may be excluded/omitted from/in a combination of resource group indicators transmitted in other than the first SCI.

For example, priority values that can be indicated/represented for each resource group indicator may be different. For example, for a reserved resource group indicated/represented by a received resource group indicator, the UE-B may differently apply whether or not to exclude the resource according to an RSRP measurement value, by using a threshold corresponding to a priority for each group, when (re)selecting resource(s). For example, the RSRP may be measured based on DMRS and/or CSI-RS of PSCCH and/or PSSCH used to indicate corresponding information. For example, the threshold may be configured differently for each resource group and/or for each use level. For example, even for the same transmission/reception priority combination, the thresholds may be different according to resource groups. Specifically, for example, the threshold may be determined based on a combination of i) a priority value indicated by a SCI received by the UE and i) a priority value of data to be transmitted by the UE. Herein, for example, the thresholds may be different for each resource group indicator. For example, a threshold for a resource group indicated by a first SCI may be different from a threshold for a resource group indicated by a resource group indicator.

For example, a use level value may be the same for each resource group indicator. In this case, a combination of resource group indicators may not include use level information. That is, use level information may be excluded/ omitted from/in the combination of resource group indicators.

For example, use level values that can be indicated/ represented for each resource group indicator may be different. For example, for a reserved resource group indicated by a received resource group indicator, the UE-B may determine resource exclusion based on an RSRP measurement value and a specific threshold. Then, the UE-B may (finally) exclude the resource from available resources of the resource (re)selection according to a use level. Alternatively, the UE-B may (finally) include the resource in available resources of the resource (re)selection according to a use level. For example, the RSRP may be measured based on DMRS and/or CSI-RS of PSCCH and/or PSSCH used to indicate corresponding information. For example, whether or not a resource can be included in available resources may be configured or pre-configured for the UE for each use level. For example, the UE may randomly and probabilistically determine whether or not a resource can be included in available resources for each use level. For example, if a reserved resource group includes N resources, the UE may randomly determine whether to include a resource in available resources for each use level up to a specific ratio (e.g., M/N) or a specific amount (e.g., M). Herein, N may be a number greater than M. For example, the specific ratio or the specific amount may be predefined for the UE. For example, the specific ratio or the specific amount may be configured or pre-configured for the UE. For example, even though an RSRP value for a resource exceeds a threshold, the UE-B may not perform resource exclusion probabilistically. For example, if an RSRP value for a resource exceeds a threshold, the UE-B may perform resource exclusion probabilistically. If the UE-B randomly determines resource exclusion probabilistically, a probability value may be configured or pre-configured for the UE for each use level. For example, whether or not a resource is included in or excluded from available resources may be configured or pre-configured for the UE for each use level. For example, whether or not a resource is included in or excluded from selected resources for PSCCH/PSSCH transmission may be configured or pre-configured for the UE for each use level.

For example, the UE may need to perform resource exclusion for a specific resource group according to a level. For example, for a specific resource group with another level, the UE may include the corresponding resource group in preferred resource(s). For example, RSRP thresholds for resources may be (pre-)configured for each use level. The UE-B may determine whether to use/consider the received information for each level.

For example, for a resource group with a first level, the UE-B may be indicated/configured to exclude the corresponding resource. For example, the UE-B may exclude the resource group configured as the first level. For example, in order to avoid half-duplex restriction, the UE-A may configure a resource set in which SL reception is impossible as the first level and provide it to the UE-B. For example, in order to avoid a problem in which transmission and reception by the UE-A overlap on the same slot, the UE-A may configure a resource set in which SL reception is impossible as the first level, and the UE-A may transmit information related to the resource set configured as the first level to the UE-B.

For example, for a resource group with a second level, the UE-B may be indicated/configured to preferentially use the corresponding resource when transmitting PSCCH/PSSCH. For example, the UE-B may transmit PSCCH/PSSCH by preferentially using the resource group configured as the second level. For example, the UE-A may configure a resource set preferred for SL reception (for reasons such as low interference) as the second level and provide it to the UE-B. For example, the UE-A may configure a resource set preferred for SL reception as the second level, and the UE-A may transmit information related to the resource set configured as the second level to the UE-B.

For example, in a situation in which the UE-B cannot use a resource with the second level (e.g., if the amount of final available resources compared to information to be transmitted is less than or equal to a specific threshold), the UE-B may not use resource information for the second level. On the other hand, the UE-B may select/determine selected resource(s) and/or available resource(s) by referring to the resource for the second level.

For example, information regarding the level may include information regarding the purpose of the resource (e.g., to solve a hidden-node problem, to solve a half-duplex restriction, and/or to inform a preferred resource) or information related to an operation of the UE-B corresponding thereto. For example, the information regarding the level may be indicated/represented by a first SCI (e.g., indicated/represented by a reserved field). For example, the information regarding the level may be transmitted in the form of a sub-header together with resource group information, through a second SCI and/or a PSSCH and/or a MAC message and/or PC5-RRC signaling.

Meanwhile, the ratio of resources that can be selected for transmission by the UE-B in a resource (re)selection procedure should be equal to or greater than a (pre)configured threshold, compared to the total amount of resources. If the ratio of available resources is less than the threshold, the UE-B may include all or part of reserved resources, among reserved resource(s) other than reserved resource(s) indicated/represented by a first SCI, in available resources again. For example, the threshold may be the same value as a first threshold used in a process of excluding resource(s) indicated/represented by a conventional first SCI from available resources based on RSRP. For example, the threshold value may be a second threshold different from the first threshold used in a process of excluding resource(s) indicated/represented by a conventional first SCI from available resources based on RSRP. In this case, for example, the first threshold and/or the second threshold may be configured or pre-configured for the UE. For example, the first threshold and/or the second threshold may be predefined for the UE. Herein, for example, the UE-B may preferentially include a reserved resource later in time in available resources. For example, the UE-B may preferentially include a reserved resource earlier in time in available resources. For example, UE-B may preferentially include a reserved resource corresponding to those having a lower priority in available resources. That is, the UE-B may preferentially include a reserved resource corresponding to those having a higher priority value in available resources.

For example, if the ratio of available resources is less than the threshold, the UE-B may include all or part of reserved resources, among reserved resource(s) other than reserved resource(s) indicated/represented by a first SCI, in available resources again. For example, the UE-B may perform boosting for an RSRP measurement value (e.g., adding 3 dB) without a process of converting reserved resource(s) back to available resources. For example, if the UE-B performs boosting for an RSRP measurement value, the UE-B may include all reserved resources other than reserved resource(s) indicated/represented by the first SCI in available resources. For example, if the UE-B performs boosting for an RSRP measurement value, the reserved resource(s) may be excluded from available resources, until the number of available resources selected based on the boosted RSRP measurement value for reserved resource(s) other than reserved resource(s) indicated/represented by the first SCI exceeds a (pre-)configured threshold. For example, if the UE-B calculates the ratio of the number of available resources to the total number of resources, the number of available resources may be determined based only on reserved resource(s) indicated/represented by the first SCI. For example, if the UE-B calculates the ratio of the number of available resources to the total number of resources, the UE-B may determine whether or not to exclude reserved resource(s) indicated/represented by the first SCI from available resources based on a sensing operation. That is, the number of available resources corresponding to the condition for triggering resource (re)selection may be different from the actual number of available resources. For example, the threshold may be the same value as a first threshold used in a process of excluding resource(s) indicated/represented by a conventional first SCI from available resources based on RSRP. For example, the threshold value may be a second threshold different from the first threshold used in a process of excluding resource(s) indicated/represented by a conventional first SCI from available resources based on RSRP. In this case, for example, the first threshold and/or the second threshold may be configured or pre-configured for the UE. For example, the first threshold and/or the second threshold may be predefined for the UE.

For example, additional resource information may indicate/represent a time domain resource and/or time interval. For example, the UE-A may indicate/represent all slots or a part of slots among SL slots within a specific time interval by using a bitmap. For example, each bit of the bitmap may correspond to a slot in a transmission resource pool and/or a reception resource pool. For example, each bit of the bitmap may correspond to a slot group in a transmission resource pool and/or a reception resource pool. For example, the number of slots included in the slot group may be configured or pre-configured for the UE for each resource pool. For example, the number of slots included in the slot group may be configured for the UE through PC5-RRC signaling. For example, the length of the bitmap may be configured or pre-configured for the UE for each resource pool. For example, the length of the bitmap may be configured for the UE through PC5-RRC signaling. For example, the bitmap may be repeatedly applied to SL slots in a resource pool. For example, the bitmap may be applied once to SL slots in a resource pool. For example, the bitmap may be repeatedly applied to SL slots in a resource pool as many times as (pre-)configured. For example, the bitmap may be repeatedly applied to SL slots in a resource pool as many times as indicated by a first SCI. For example, the bitmap may be repeatedly applied to SL slots in a resource pool as many times as indicated by a second SCI. For example, the bitmap may be repeatedly applied to SL slots in a resource pool as many times as indicated by a PSSCH. For example, a second bitmap indicating/representing a time interval to which the bitmap is applied may be also used. For example, UE-A may indicate/represent a part of a time interval by using a second bitmap, and the UE-A may indicate/represent SL slot information within the time interval indicated/represented by the second bitmap by using the first bitmap. For example, the length of the second bitmap may be configured or pre-configured for the UE for each resource pool. For example, the length of the second bitmap may be configured for the UE through PC5-RRC signaling. For example, the time domain resource may have a form in which a second period is repeated in units of a first period value, and a slot or a group of slots is repeated in units of a second period value within the second period. For example, a first offset (e.g., a slot offset or an absolute time offset) for a position of a second period within a first period may be applied. For example, a second offset (e.g., a slot offset or an absolute time offset) indicating/representing a start position of a slot or group of slots within the second period may be applied.

For example, the first period value may be configured or pre-configured for the UE for each resource pool. For example, the second period value may be configured or pre-configured for the UE for each resource pool. For example, the first offset may be configured or pre-configured for the UE for each resource pool. For example, the second offset may be configured or pre-configured for the UE for each resource pool. For example, the first period value may be configured or pre-configured for the UE for each second SCI format. For example, the second period value may be configured or pre-configured for the UE for each second SCI format. For example, the first offset may be configured or pre-configured for the UE for each second SCI format. For example, the second offset may be configured or pre-configured for the UE for each second SCI format. For example, the first period value may be configured or pre-configured for the UE for each second SCI indication value. For example, the second period value may be configured or pre-configured for the UE for each second SCI indication value. For example, the first offset may be configured or pre-configured for the UE for each second SCI indication value. For example, the second offset may be configured or pre-configured for the UE for each second SCI indication value.

For example, all types and/or characteristics of usable or unusable data for each resource group indicator may be the same. In this case, information related to a type and/or a characteristic of usable or unusable data may be indicated/represented only once for a plurality of resource groups.

For example, types and/or characteristics of usable or unusable data for each resource group indicator may be different. For example, information related to a type and/or a characteristic of usable or unusable data may include a recommended priority value. For example, information related to a type and/or a characteristic of usable or unusable data may include a threshold value for a priority value. For example, information related to a type and/or a characteristic of usable or unusable data may include a recommended QoS parameter. For example, information related to a type and/or a characteristic of usable or unusable data may include a recommended service type. For example, information related to a type and/or a characteristic of usable or unusable data may include a recommended transmission type (e.g., cast type and/or HARQ feedback/option and/or rank and/or MCS table and/or MCS index range and/or whether CSI reporting is supported). For example, information related to a type and/or a characteristic of usable or unusable data may include a threshold for the remaining PDB. For example, the UE-B may use the indicated priority value for the indicated resource(s). For example, the UE-B may perform PSSCH transmission having a priority equal to or less than a priority threshold by using the indicated resource(s). For example, the UE-B may not perform PSSCH transmission other than the recommended transmission type and/or the characteristic, by using the indicated resource(s).

For example, the UE-A may transmit the additional resource information through a second SCI. For example, UE-A may transmit the additional resource information through a PSSCH (e.g., a higher layer message (e.g., a MAC layer message and/or an AS layer message and/or a V2X layer message).

Meanwhile, if the UE-B performs resource (re)selection by using information related to additional reserved resource(s), SL transmission may be canceled or SL transmit power may be reduced due to a collision between UL and SL, and due to this, a benefit according to the use of additional reserved resource(s) may be reduced. Therefore, for example, if the UE-B transmits PSCCH/PSSCH and/or PSFCH on a resource indicated/represented by the UE-A, a threshold used for UL-SL prioritization may be configured or pre-configured separately for the UE. For example, if the UE-B transmits PSCCH/PSSCH and/or PSFCH on a resource indicated/represented by the UE-A, a priority of SL transmission may be configured to be high in UL-SL prioritization. For example, if the UE-B performs resource (re)selection based on a resource indicated/represented by the UE-A, and the UE-B performs PSSCH transmission by using the (re)selected resource, a threshold used for UL-SL prioritization may be configured or pre-configured separately for the UE. For example, if the UE-B performs resource (re)selection based on a resource indicated/represented by the UE-A, and the UE-B performs PSSCH transmission by using the (re)selected resource, a priority of SL transmission may be configured to be high in UL-SL prioritization.

For example, the UE-B may determine whether to use additional information (e.g., assistance information) described in various embodiments of the present disclosure, based on a geographical distance from the UE-A providing the additional information. For example, the UE-B may or may not use the additional information according to a geographical distance from the UE-A providing the additional information. For example, the UE-A may transmit the additional information described in various embodiments of the present disclosure to the UE-B, and the UE-A may additionally transmit geographical location information (e.g., Zone ID) of the UE-A to the UE-B. For example, the geographic location information of the UE-A may be included in the additional information. For example, the UE-B may obtain a distance between the UE-B and the UE-A based on its own location information (i.e., UE-B's location information) and UE-A's geographical location information. Herein, for example, if the distance is less than or equal to (less than) a specific threshold, the UE-B may use the additional information received from the UE-A. For example, if the distance greater than (greater than or equal to) a specific threshold, the UE-B may not use the additional information received from the UE-A. For example, the threshold(s) may be predefined for the UE. For example, the threshold(s) may be configured or pre-configured for the UE. For example, the UE may randomly determine the threshold(s).

For example, the UE-B may determine whether to use additional information (e.g., assistance information) described in various embodiments of the present disclosure, based on the received power or quality of a signal or a channel including the additional information. For example, the UE-B may or may not use the additional information according to the received power or quality of the signal or the channel including the additional information. For example, UE-B may measure an RSRP value for the signal or the channel including the additional information provided by the UE-A. Herein, for example, if the RSRP value is greater than or equal to (greater than) a specific threshold, the UE-B may use the additional information received from the UE-A. For example, if the RSRP value is less than (less than or equal to) a specific threshold, the UE-B may not use the additional information received from the UE-A. For example, the threshold(s) may be predefined for the UE. For example, the threshold(s) may be configured or pre-configured for the UE. For example, the UE may randomly determine the threshold(s).

For example, the UE-B may determine whether to use additional information (e.g., assistance information) described in various embodiments of the present disclosure, based on a priority related to a signal or a channel including the additional information. For example, the UE-B may or may not use the additional information according to the priority of the signal or the channel including the additional information. For example, if the priority value corresponding to the additional information is less than or equal to (less than) a specific threshold, the UE-B may use the additional information received from the UE-A. For example, a low priority value may refer to a high priority. For example, if the priority value corresponding to the additional information is less than or equal to (less than) a priority value corresponding to data transmission of the UE-B, the UE-B may use the additional information received from the UE-A. For example, the threshold(s) may be predefined for the UE. For example, the threshold(s) may be configured or pre-configured for the UE. For example, the UE may randomly determine the threshold(s). For example, the priority of the signal or the channel including the additional information may be the maximum value among priority values available to the UE-A transmitting the additional information. For example, the priority of the signal or the channel including the additional information may be the minimum value among priority values available to the UE-A transmitting the additional information. For example, the priority of the signal or the channel including the additional information may be the maximum value among priority values available for a resource through which the additional information is transmitted. For example, the priority of the signal or the channel including the additional information may be the minimum value among priority values available for a resource through which the additional information is transmitted. For example, the priority of the signal or the channel including the additional information may be the maximum priority value of a MAC PDU transmitted together with the additional information. For example, the priority of the signal or the channel including the additional information may be the minimum priority value of a MAC PDU transmitted together with the additional information. For example, the priority of the signal or the channel including the additional information may be configured or pre-configured for the UE for each resource pool. For example, the priority of the signal or the channel including the additional information may be configured or pre-configured for the UE for each resource pool congestion level. For example, the priority of the signal or the channel including the additional information may be configured or pre-configured for the UE for each service type. For example, the priority of the signal or the channel including the additional information may be configured or pre-configured for the UE for each UE speed. For example, the priority of the signal or the channel including the additional information may be configured or pre-configured for the UE for each QoS parameter. For example, an L1 source ID and/or an L2 source ID for the signal or the channel including the additional information may be configured or pre-configured for the UE for each resource pool. For example, an L1 destination ID and/or an L2 destination ID for the signal or the channel including the additional information may be configured or pre-configured for the UE for each resource pool. For example, a cast type for the signal or the channel including the additional information may be configured or pre-configured for the UE for each resource pool. For example, whether to provide HARQ feedback for the signal or the channel including the additional information may be configured or pre-configured for the UE for each resource pool. For example, an HARQ feedback option for the signal or the channel including the additional information may be configured or pre-configured for the UE for each resource pool.

Figure 12:
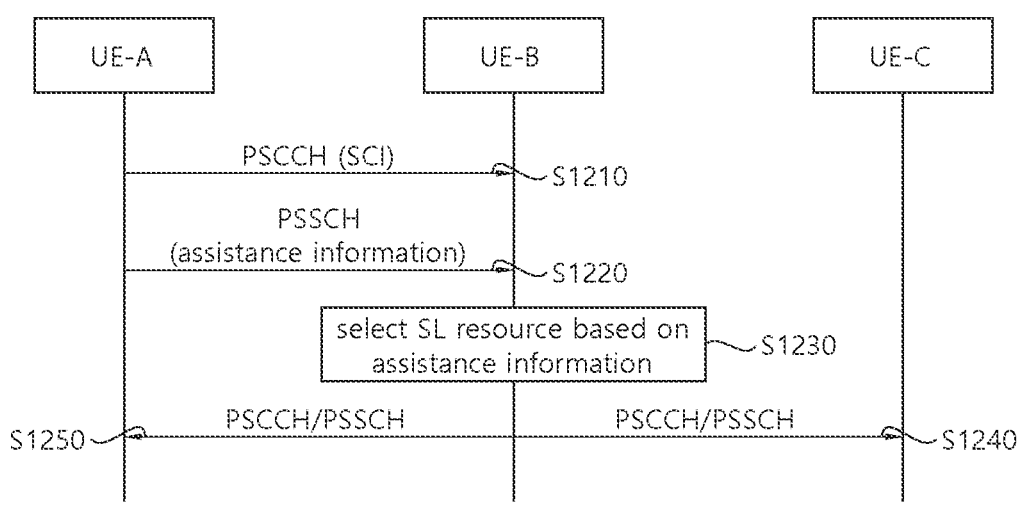
FIG. 12 shows a procedure for a UE to perform SL communication based on assistance information, based on an embodiment of the present disclosure.

FIG. 12 shows a procedure for a UE to perform SL communication based on assistance information, based on an embodiment of the present disclosure. The embodiment of FIG. 12 may be combined with various embodiments of the present disclosure.

Referring to FIG. 12, in step S1210, the UE-B may receive a SCI from the UE-A through a PSCCH. For example, the SC may include information for scheduling a PSSCH. In step S1220, the UE-B may receive assistance information from the UE-A through the PSSCH. For example, the assistance information may be included in a MAC PDU. For example, the assistance information may include information proposed in various embodiments of the present disclosure. In step S1230, the UE-B may select a SL resource based on the assistance information.

In step S1240, the UE-B may transmit a PSCCH and/or a PSSCH to the UE-C based on the selected SL resource.

Alternatively/additionally, in step S1250, the UE-B may transmit a PSCCH and/or a PSSCH to the UE-A based on the selected SL resource.

Figure 13:
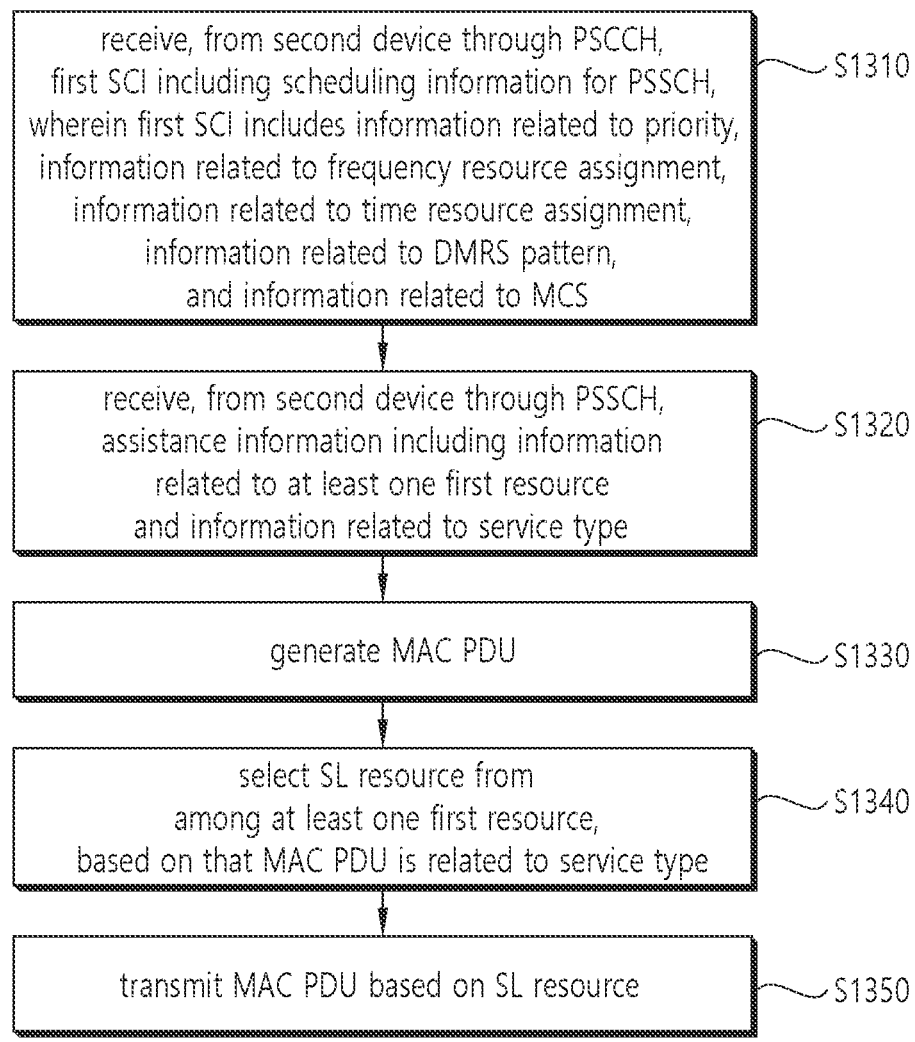
FIG. 13 shows a method for performing wireless communication by a first device, based on an embodiment of the present disclosure.

FIG. 13 shows a method for performing wireless communication by a first device, based on an embodiment of the present disclosure. The embodiment of FIG. 13 may be combined with various embodiments of the present disclosure.

Referring to FIG. 13, in step S1310, the first device may receive, from a second device through a physical sidelink control channel (PSCCH), first sidelink control information (SCI) including scheduling information for a physical sidelink shared channel (PSSCH). For example, the first SCI may include information related to a priority, information related to frequency resource assignment, information related to time resource assignment, information related to a demodulation reference signal (DMRS) pattern, and information related to modulation and coding scheme (MCS). In step S1320, the first device may receive, from the second device through the PSSCH, assistance information including information related to at least one first resource and information related to a service type. In step S1330, the first device may generate a medium access control (MAC) protocol data unit (PDU). In step S1340, the first device may select a sidelink (SL) resource from among the at least one first resource, based on that the MAC PDU is related to the service type. In step S1350, the first device may transmit the MAC PDU based on the SL resource.

For example, based on that the MAC PDU is not related to the service type, the SL resource may be selected other than the at least one first resource.

For example, based on that (i) the assistance information includes information related to a priority value and (ii) a priority value of the MAC PDU is less than or equal to the priority value included in the assistance information, the SL resource may be selected from among the at least one first resource.

For example, based on that (i) the assistance information includes information related to a cast type and (ii) a cast type for transmission of the MAC PDU is same as the cast type included in the assistance information, the SL resource may be selected from at least one first resource.

Additionally, for example, the first device may obtain a reference signal received power (RSRP) value for the at least one first resource, based on the assistance information including information related to an RSRP range. In this case, for example, the SL resource may be selected from among at least one resource in which the RSRP value is within the RSRP range, among the at least one first resource.

For example, the assistance information may include information related to a reception available time domain of the second device or information related to a reception unavailable time domain of the second device. For example, the reception available time domain or the reception unavailable time domain may be determined by the second device, based on at least one of a scheduled time for uplink (UL) transmission of the second device, a scheduled time for downlink (DL) reception of the second device, or a scheduled time for sidelink (SL) transmission of the second device. For example, the UL transmission or the DL reception may be UL transmission or DL reception for random access.

Additionally, for example, the first device may receive, from the second device through the PSSCH, second SCI including a zone ID of the second device, and the first device may obtain a distance between the first device and the second device based on a location of the first device and the zone ID of the second device, and the first device may determine whether or not to use the assistance information based on the distance.

Additionally, for example, the first device may measure received power related to the PSSCH, and the first device may determine whether or not to use the assistance information based on the received power.

For example, a priority of the assistance information may be configured for each resource pool.

Additionally, for example, the first device may receive, from the second device through the PSSCH, second SCI including a source ID and a destination ID. In this case, the source ID or the destination ID may be an ID configured for each resource pool for the assistance information.

For example, the assistance information may include information related to at least one second resource, and the at least one second resource may be at least one non-preferred resource configured as a first level, and the at least one first resource may be at least one preferred resource configured as a second level.

The proposed method can be applied to the device(s) based on various embodiments of the present disclosure. First, the processor 102 of the first device 100 may control the transceiver 106 to receive, from a second device through a physical sidelink control channel (PSCCH), first sidelink control information (SCI) including scheduling information for a physical sidelink shared channel (PSSCH). For example, the first SCI may include information related to a priority, information related to frequency resource assignment, information related to time resource assignment, information related to a demodulation reference signal (DMRS) pattern, and information related to modulation and coding scheme (MCS). In addition, the processor 102 of the first device 100 may control the transceiver 106 to receive, from the second device through the PSSCH, assistance information including information related to at least one first resource and information related to a service type. In addition, the processor 102 of the first device 100 may generate a medium access control (MAC) protocol data unit (PDU). In addition, the processor 102 of the first device 100 may select a sidelink (SL) resource from among the at least one first resource, based on that the MAC PDU is related to the service type. In addition, the processor 102 of the first device 100 may control the transceiver 106 to transmit the MAC PDU based on the SL resource.

Based on an embodiment of the present disclosure, a first device adapted to perform wireless communication may be provided. For example, the first device may comprise; one or more memories storing instructions; one or more transceivers; and one or more processors connected to the one or more memories and the one or more transceivers. For example, the one or more processors may execute the instructions to: receive, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); receive, from the second device through the PSSCH, assistance information including information related to at least one first resource and information related to a service type; generate a medium access control (MAC) protocol data unit (PDU); select a sidelink (SL) resource from among the at least one first resource, based on that the MAC PDU is related to the service type; and transmit the MAC PDU based on the SL resource.

Based on an embodiment of the present disclosure, an apparatus adapted to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a second UE through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); receive, from the second UE through the PSSCH, assistance information including information related to at least one first resource and information related to a service type; generate a medium access control (MAC) protocol data unit (PDU); select a sidelink (SL) resource from among the at least one first resource, based on that the MAC PDU is related to the service type; and transmit the MAC PDU based on the SL resource.

Based on an embodiment of the present disclosure, a non-transitory computer-readable storage medium storing instructions may be provided. For example, the instructions, when executed, may cause a first device to: receive, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); receive, from the second device through the PSSCH, assistance information including information related to at least one first resource and information related to a service type; generate a medium access control (MAC) protocol data unit (PDU); select a sidelink (SL) resource from among the at least one first resource, based on that the MAC PDU is related to the service type; and transmit the MAC PDU based on the SL resource.

Figure 14:
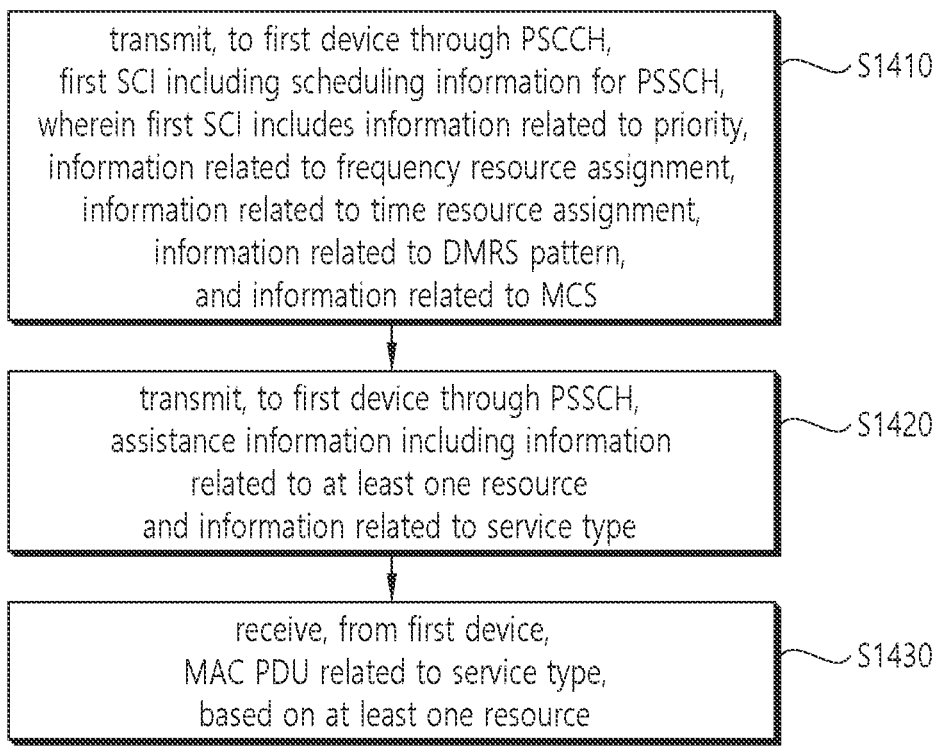
FIG. 14 shows a method for performing wireless communication by a second device, based on an embodiment of the present disclosure.

FIG. 14 shows a method for performing wireless communication by a second device, based on an embodiment of the present disclosure. The embodiment of FIG. 14 may be combined with various embodiments of the present disclosure.

Referring to FIG. 14, in step S1410, the second device may transmit, to a first device through a physical sidelink control channel (PSCCH), first sidelink control information (SCI) including scheduling information for a physical sidelink shared channel (PSSCH). For example, the first SCI may include information related to a priority, information related to frequency resource assignment, information related to time resource assignment, information related to a demodulation reference signal (DMRS) pattern, and information related to modulation and coding scheme (MCS). In step S1420, the second device may transmit, to the first device through the PSSCH, assistance information including information related to at least one resource and information related to a service type. In step S1430, the second device may receive, from the first device, a medium access control (MAC) protocol data unit (PDU) related to the service type, based on the at least one resource.

The proposed method can be applied to the device(s) based on various embodiments of the present disclosure. First, the processor 202 of the second device 200 may control the transceiver 206 to transmit, to a first device through a physical sidelink control channel (PSCCH), first sidelink control information (SCI) including scheduling information for a physical sidelink shared channel (PSSCH). For example, the first SCI may include information related to a priority, information related to frequency resource assignment, information related to time resource assignment, information related to a demodulation reference signal (DMRS) pattern, and information related to modulation and coding scheme (MCS). In addition, the processor 202 of the second device 200 may control the transceiver 206 to transmit, to the first device through the PSSCH, assistance information including information related to at least one resource and information related to a service type. In addition, the processor 202 of the second device 200 may control the transceiver 206 to receive, from the first device, a medium access control (MAC) protocol data unit (PDU) related to the service type, based on the at least one resource.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); transmit, to the first device through the PSSCH, assistance information including information related to at least one resource and information related to a service type; and receive, from the first device, a medium access control (MAC) protocol data unit (PDU) related to the service type, based on the at least one resource.

Based on an embodiment of the present disclosure, an apparatus adapted to control a second user equipment (UE) performing wireless communication may be provided. For example, the apparatus may comprise: one or more processors; and one or more memories operably connected to the one or more processors and storing instructions. For example, the one or more processors may execute the instructions to: transmit, to a first UE through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); transmit, to the first UE through the PSSCH, assistance information including information related to at least one resource and information related to a service type; and receive, from the first UE, a medium access control (MAC) protocol data unit (PDU) related to the service type, based on the at least one resource.

Based on an embodiment of the present disclosure, a non-transitory computer-readable storage medium storing instructions may be provided. For example, the instructions, when executed, may cause a second device to: transmit, to a first device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS); transmit, to the first device through the PSSCH, assistance information including information related to at least one resource and information related to a service type; and receive, from the first device, a medium access control (MAC) protocol data unit (PDU) related to the service type, based on the at least one resource.

Based on various embodiments of the present disclosure, the UE which has received assistance information can efficiently (re)select resource(s) for transmission of the UE based on the assistance information.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
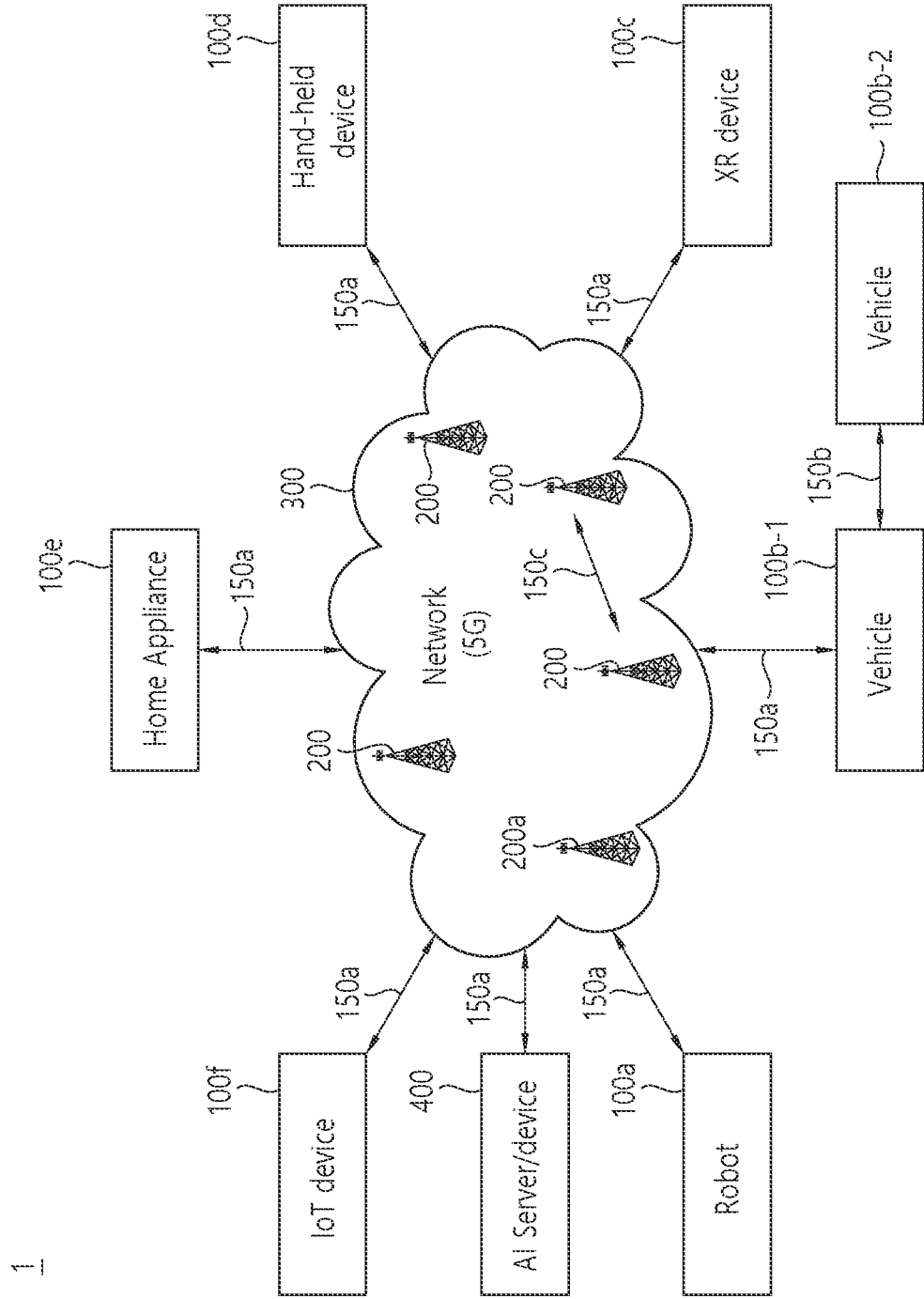
FIG. 15 shows a communication system 1, based on an embodiment of the present disclosure.

FIG. 15 shows a communication system 1, based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
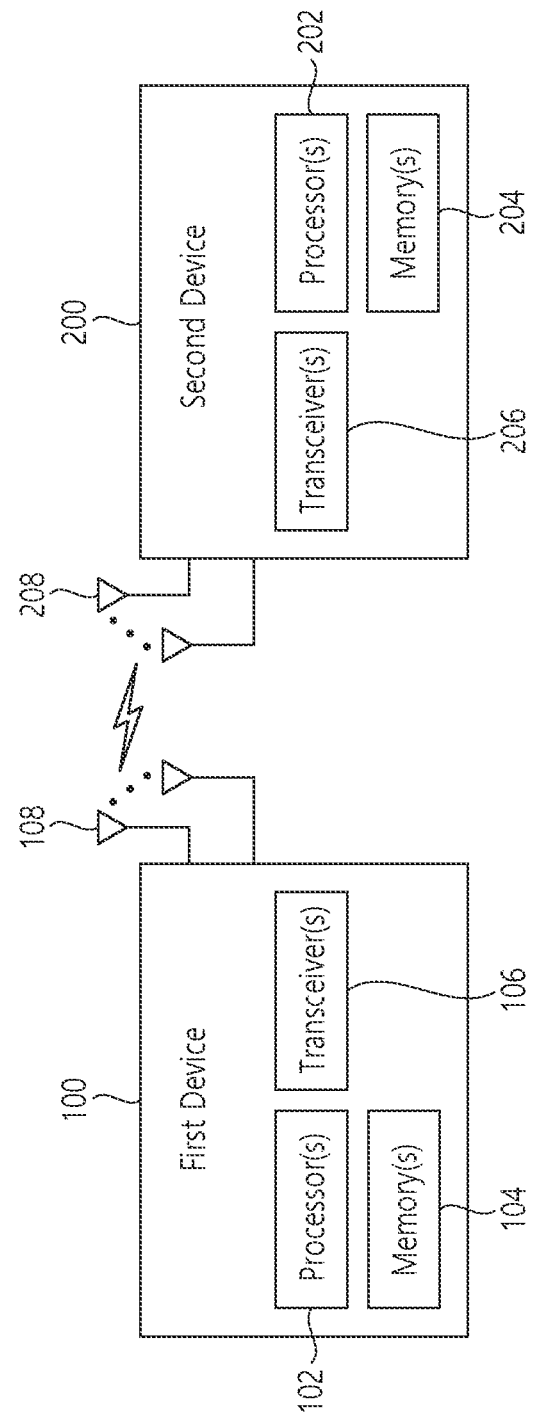
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 16 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
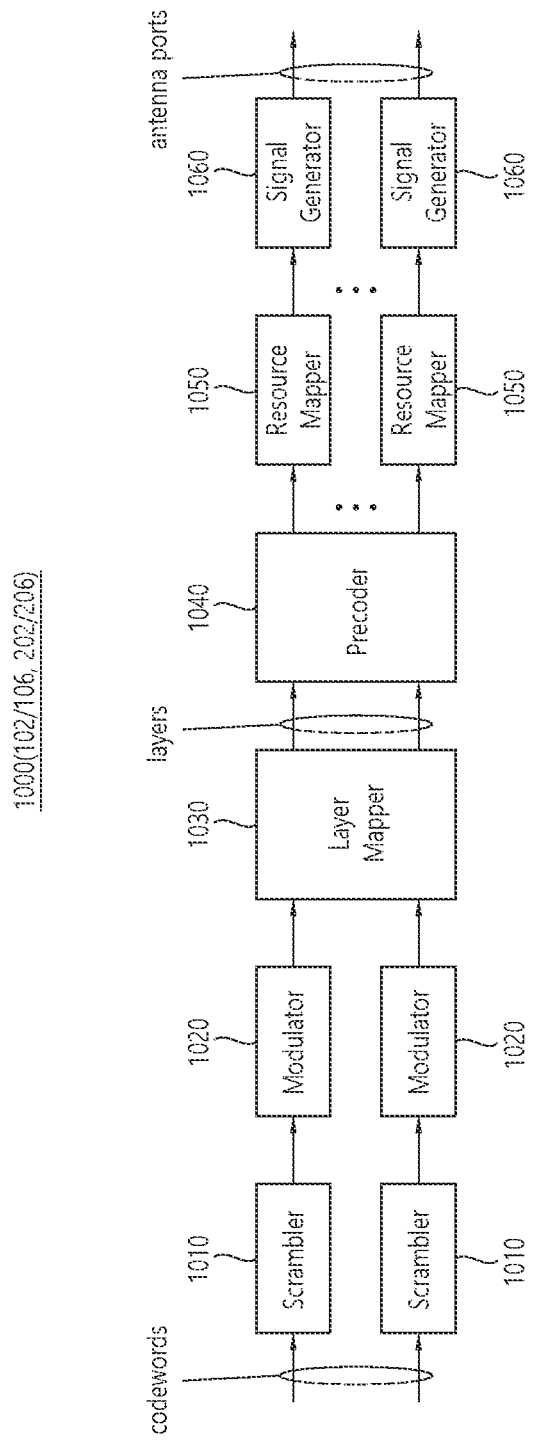
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
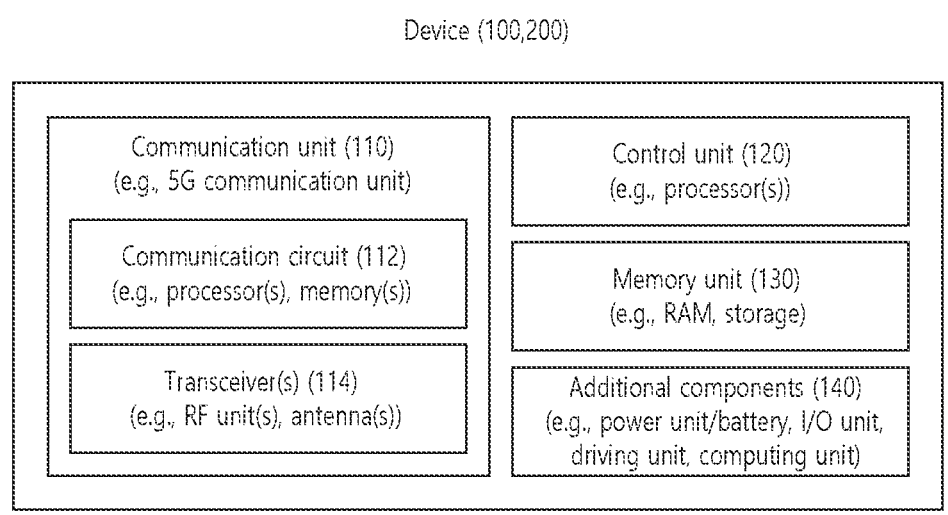
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
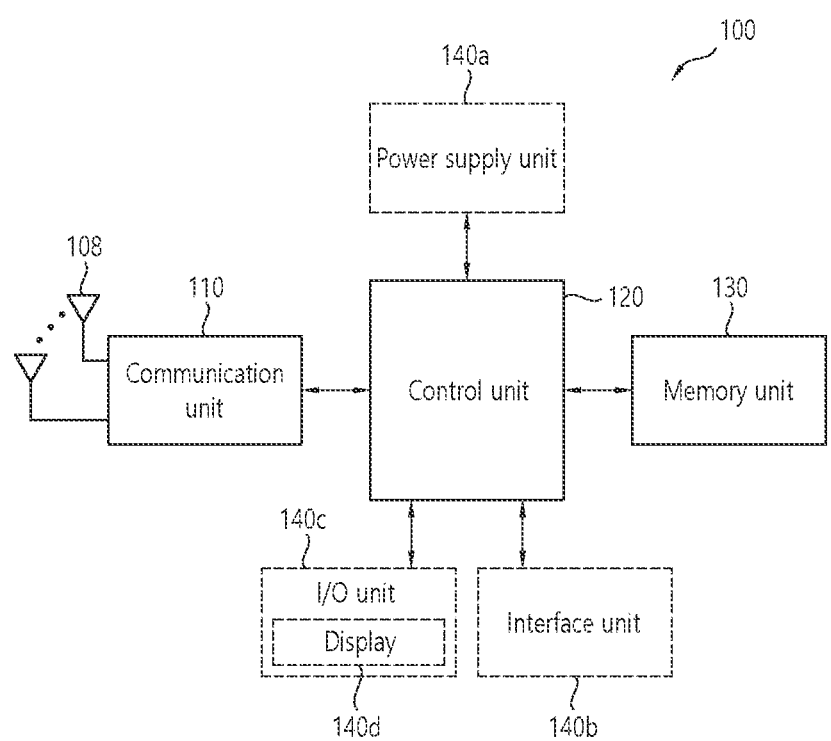
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
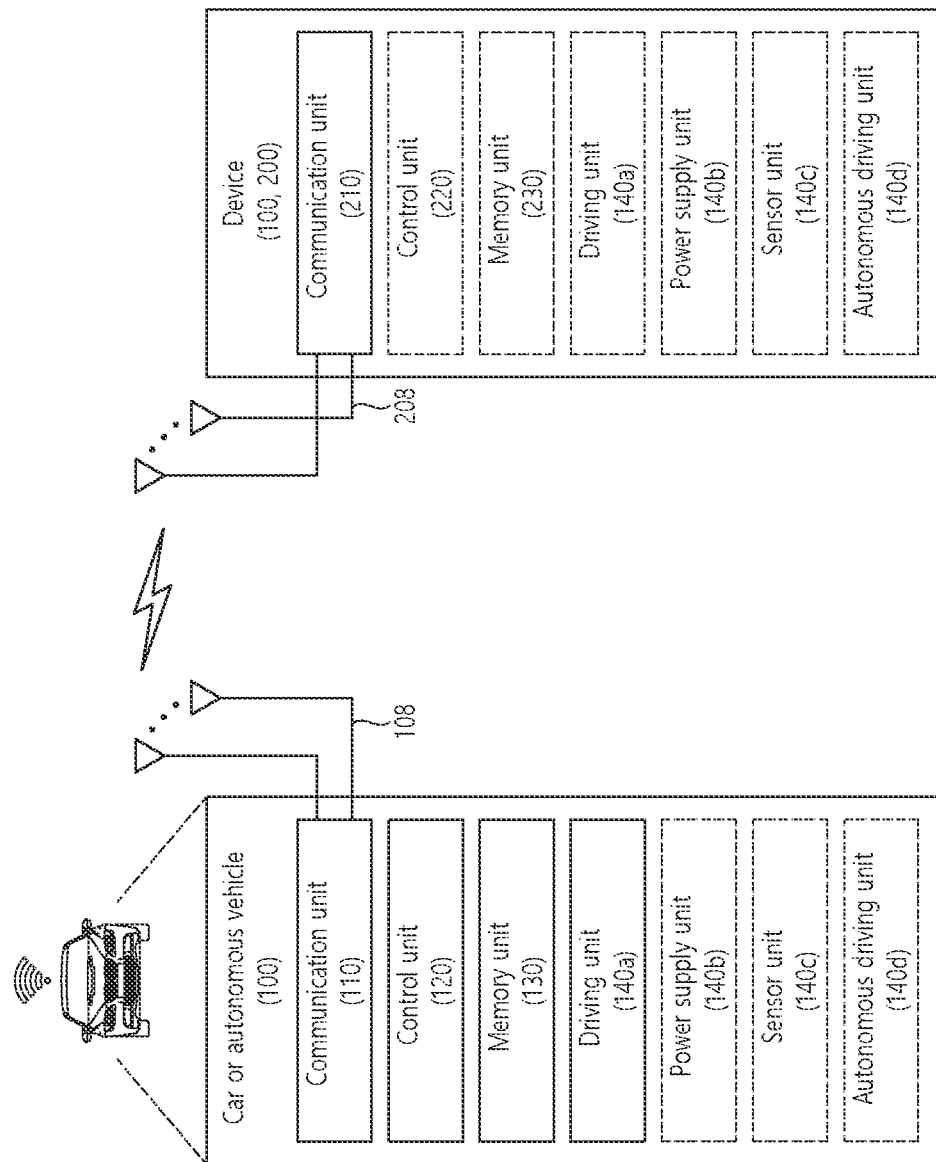
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS);
   receiving, from the second device through the PSSCH, resource information including information related to a set of preferred resources or information related to a set of non-preferred resources;
   generating a first medium access control (MAC) protocol data unit (PDU);
   selecting a sidelink (SL) resource based on the resource information; and
   transmitting the first MAC PDU based on the SL resource,
   wherein the information related to the set of preferred resources or the information related to the set of non-preferred resources is represented by one field representing a combination of a time resource indicator value (TRIV), a frequency resource indicator value (FRIV) and a resource reservation period.

2. The method of claim 1, wherein the resource information including the information related to the set of preferred resources or the information related to the set of non-preferred resources is included in second SCI scheduled by the first SCI, and
   wherein the second SCI is received from the second device through the PSSCH.

3. The method of claim 1, wherein the resource information including the information related to the set of preferred resources or the information related to the set of non-preferred resources is included in a second MAC PDU, and
   wherein the second MAC PDU is received from the second device through the PSSCH.

4. The method of claim 1, wherein the set of non-preferred resources is excluded from a set of candidate resources for selecting the SL resource, based on the resource information including the information related to the set of non-preferred resources.

5. The method of claim 1, wherein the information related to the set of non-preferred resources includes information related to a time domain in which the second device is not able to perform SL reception.

6. The method of claim 5, wherein the time domain in which the second device is not able to perform SL reception is a time domain in which the second device is not able to perform SL reception due to transmission of the second device.

7. The method of claim 1, wherein the information related to the set of preferred resources includes information related to a time domain in which the second device is able to perform SL reception.

8. The method of claim 7, wherein the time domain in which the second device is able to perform SL reception is included in a time domain excluding a time domain in which the second device is not able to perform SL reception due to transmission of the second device.

9. The method of claim 1, wherein a priority value of the resource information is configured for each resource pool.

10. The method of claim 1, wherein the information related to the priority included in the first SCI is set to a priority value of resource information configured for a resource pool.

11. A first device adapted to perform wireless communication, the first device comprising:
    one or more transceivers;
    one or more processors operably connected to the one or more transceivers; and one or more memories operably connected to the one or more processors and storing instructions that, when executed by the one or more processors, perform operations comprising:

receiving, via the one or more transceivers from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS);

receiving, via the one or more transceivers from the second device through the PSSCH, resource information including information related to a set of preferred resources or information related to a set of non-preferred resources;

generating a first medium access control (MAC) protocol data unit (PDU);

selecting a sidelink (SL) resource based on the resource information; and transmitting, via the one or more transceivers, the first MAC PDU based on the SL resource, wherein the information related to the set of preferred resources or the information related to the set of non-preferred resources is represented by one field representing a combination of a time resource indicator value (TRIV), a frequency resource indicator value (FRIV) and a resource reservation period.

12. The first device of claim 11, wherein the resource information including the information related to the set of preferred resources or the information related to the set of non-preferred resources is included in second SCI scheduled by the first SCI, and wherein the second SCI is received from the second device through the PSSCH.

13. The first device of claim 11, wherein the resource information including the information related to the set of preferred resources or the information related to the set of non-preferred resources is included in a second MAC PDU, and wherein the second MAC PDU is received from the second device through the PSSCH.

14. The first device of claim 11, wherein the information related to the set of non-preferred resources includes information related to a time domain in which the second device is not able to perform SL reception.

15. The first device of claim 11, wherein a priority value of the resource information is configured for each resource pool.

16. A processing device adapted to control a first device to perform wireless communication, the processing device comprising:

one or more processors; and one or more memories operably connected to the one or more processors and storing instructions that, when executed by the one or more processors, perform operations comprising:

receiving, from a second device through a physical sidelink control channel (PSCCH), first sidelink control information (SCI) including scheduling information for a physical sidelink shared channel (PSSCH), wherein the first SCI includes information related to a priority, information related to frequency resource assignment, information related to time resource assignment, information related to a demodulation reference signal (DMRS) pattern, and information related to modulation and coding scheme (MCS);

receiving, from the second device through the PSSCH, resource information including information related to a set of preferred resources or information related to a set of non-preferred resources;

generating a first medium access control (MAC) protocol data unit (PDU);

selecting a sidelink (SL) resource based on the resource information; and transmitting the first MAC PDU based on the SL resource, wherein the information related to the set of preferred resources or the information related to the set of non-preferred resources is represented by one field representing a combination of a time resource indicator value (TRIV), a frequency resource indicator value (FRIV) and a resource reservation period.

17. The processing device of claim 16, wherein the resource information including the information related to the set of preferred resources or the information related to the set of non-preferred resources is included in second SCI scheduled by the first SCI, and wherein the second SCI is received from the second device through the PSSCH.

18. The processing device of claim 16, wherein the resource information including the information related to the set of preferred resources or the information related to the set of non-preferred resources is included in a second MAC PDU, and wherein the second MAC PDU is received from the second device through the PSSCH.

19. The processing device of claim 16, wherein the information related to the set of non-preferred resources includes information related to a time domain in which the second device is not able to perform SL reception.

20. The processing device of claim 16, wherein a priority value of the resource information is configured for each resource pool.

* * * * *